United States Patent [19]
Hirahara et al.

[11] Patent Number: 5,531,080
[45] Date of Patent: Jul. 2, 1996

[54] REFRIGERANT CIRCULATING SYSTEM

[75] Inventors: Takuho Hirahara; Susumu Kawaguchi; Tatsuaki Shimizu; Katsuyuki Kawasaki; Noboru Masuda; Shinobu Ogasawara; Hiroshige Konishi; Hitoshi Maruyama, all of Shizuoka; Yoshihiro Sumida, Hyogo; Akemi Ueyama, Hyogo; Satoru Toyama, Hyogo; Sou Suzuki; Yasushi Akahori, both of Shizuoka, all of Japan

[73] Assignee: Mitsubishi Denki Kabushiki Kaisha, Tokyo, Japan

[21] Appl. No.: 273,848

[22] Filed: Jul. 12, 1994

Related U.S. Application Data

[63] Continuation-in-part of Ser. No. 206,846, Mar. 7, 1994.

[30] Foreign Application Priority Data

| Apr. 27, 1993 | [JP] | Japan | 5-101264 |
| Nov. 30, 1993 | [JP] | Japan | 5-300220 |
| Apr. 26, 1994 | [JP] | Japan | 6-088957 |

[51] Int. Cl.$^6$ .................................................. F25B 43/02
[52] U.S. Cl. .................. 62/470; 62/84; 62/468; 62/498; 62/503
[58] Field of Search ................. 62/84, 114, 468, 62/470, 498, 503

[56] References Cited

U.S. PATENT DOCUMENTS

| 1,620,713 | 3/1927 | Bell . | |
| 1,899,378 | 2/1933 | Zouck et al. . | |
| 2,314,591 | 3/1943 | McCormack . | |
| 3,092,981 | 6/1963 | Begeman et al. | 62/468 |
| 3,978,685 | 9/1976 | Taylor | 62/471 |
| 4,046,533 | 9/1977 | Olund | 62/468 |
| 4,231,230 | 11/1980 | Gratzer et al. | 62/503 |
| 4,429,544 | 2/1984 | McCarty | 62/84 |
| 4,586,351 | 5/1986 | Igarashi et al. | 62/468 |
| 4,755,316 | 7/1988 | Magid et al. . | |
| 4,916,914 | 4/1990 | Short | 62/84 |
| 5,202,044 | 4/1993 | Hagihara et al. | 252/68 |
| 5,345,785 | 9/1994 | Sekigami et al. | 62/468 |
| 5,355,695 | 10/1994 | Kawaguchi et al. | 62/498 |

FOREIGN PATENT DOCUMENTS

| 0017747 | 10/1980 | European Pat. Off. . |
| 0343662 | 11/1989 | European Pat. Off. . |
| 0406479 | 1/1991 | European Pat. Off. . |
| 0485979 | 5/1992 | European Pat. Off. . |
| 0498152 | 8/1992 | European Pat. Off. . |
| 0537983 | 4/1993 | European Pat. Off. . |

OTHER PUBLICATIONS

U.S. Ser. No. 08/273,848, filed Jul. 12, 1994, pending.
U.S. Ser. No. 08/582,932, filed Jan. 4, 1996, pending.

*Primary Examiner*—Christopher Kilner
*Attorney, Agent, or Firm*—Oblon, Spivak, McClelland, Maier, & Neustadt

[57] ABSTRACT

A refrigerant circulating system that uses a highly polar refrigerant, as typified by a hydrofluorocarbon-based one, and a refrigerating oil that has slight solubility with a liquid refrigerant on the condensation side. Also, a refrigerant circulating cycle that uses a highly polar refrigerant, as typified by a hydrofluorocarbon-based one, and a refrigerating oil that has a slight solubility with a liquid refrigerant and which has a greater specific gravity than the liquid refrigerant. Thereby, it provides a high electrical insulation and moisture resistance, good oil return to the compressor, and high reliability.

28 Claims, 16 Drawing Sheets

REFRIGERANT CIRCULATING SYSTEM

The present application is a continuation-in-part application of application Ser. No. 08/206,846, filed Mar. 7, 1994.

BACKGROUND OF THE INVENTION

This invention relates to a refrigerant circulating system which uses a refrigerant which essentially contains hydrofluorocarbon or third generation refrigerants.

An example of a conventional refrigerant circulating system is as shown in FIG. 14.

As indicated by the publication "Tribologist" Vol. 35, No. 9 (1990) pp. 621 to 626, in forming a refrigerating machine using an HFC134a refrigerant containing hydrofluorocarbon, PAG (polyether) or ester refrigerating machine oil is employed, because the solubility of the refrigerant and the refrigerating machine oil is one of the important factors determining the performance of the refrigerant circulating system. The conventional refrigerant circulating system shown in FIG. 14 is a refrigerating machine using an HFC134a refrigerant. In FIG. 14, reference numeral 1 designates a compressor for compressing a refrigerant gas; 2, a condenser for condensing a high pressure refrigerant gas discharged from the compressor 1; 3, a throttle mechanism; 4, an evaporator; 5, a 4-way valve having a function of reversing the direction of flow of the refrigerant; 8, an accumulator adapted to adjust the quantity of refrigerant; and 6a, 6b a refrigerating machine oil kept in the compressor 1 to lubricate the slide parts of the compressor 1 and to seal the compressing chamber thereof, the oil being PAG 6a or ester refrigerating machine oil 6b.

The behavior of the oil in the system will be described. The refrigerant compressed by the compressor 1 is supplied into the condenser 2. A larger part of the lubricant 6a or 6b used for lubricating the compressor and sealing the compressing chamber returns to the bottom of the compressor; however, the lubricant 6a or 6b which corresponds to about 0.5 to 3.0% of the refrigerant by weight is discharged together with the refrigerant from the compressor. The oil 6a or 6b thus discharged is soluble with the refrigerant. Therefore, it flows smoothly through the condenser 2, the capillary tube 3, and the evaporator 4 into the accumulator 8, where it is dissolved in the excess of liquid refrigerant 7a, thus returning through an oil returning hole 82 into the compressor 1. Hence, the lubricant 6 is kept in the compressor 1 at all times, thus performing the lubrication satisfactorily.

Another example of the conventional refrigerant circulating system is as shown in FIG. 15.

Heretofore, as disclosed by Japanese Patent Unexamined Publication (Kokai) Hei-5-17789/(1992), a refrigerant circulating system employing a refrigerant mixture containing an inflammable refrigerant HFC32 uses a refrigerating machine oil such as ester refrigerating machine oil high in solubility. FIG. 15 shows an air conditioner using a refrigerant mixture of HFC32, HFC125 and HFC134a. In FIG. 15, reference numeral 1 designates a compressor for compressing the refrigerant gas; 2, a condenser for condensing a high pressure refrigerant discharged from the compressor 1; 3, a throttling mechanism; 4, an evaporator; 5, a 4-way valve for reversing the flow of refrigerant; 8, an accumulator having a function of adjusting the quantity of refrigerant; and 6b, a refrigerating machine oil used for lubricating the slide parts of the compressor 1 and sealing a compression chamber. More specifically, the refrigerating machine oil is an ester refrigerating machine oil 6b.

The refrigerant sucked into the compressor 1, after cooling an electric motor 12 in a closed container 11, is compressed by a compressing mechanism 13, and discharged through the 4-way valve 5 into the condenser 2. In this operation, the refrigerating machine oil 6b pooled in the bottom of the closed container 11 is exposed to the atmosphere of the refrigerant sucked into the compressor, and a large quantity of refrigerant is dissolved into the refrigerating machine oil 6b, because the latter 6b is high in solubility.

The conventional HFC134a refrigerant circulating system is designed as described above. The PAG (polyether) 6a has a volume resistivity of $10^7$ to $10^{10}$ $\Omega$cm, and a saturated water content of about 25000 ppM; whereas the ester refrigerating machine oil, 6b is superior in characteristic to the PAG, having a volume resistivity of $10^{12}$ to $10^{14}$ $\Omega$cm, and a saturated water content of about 1500 ppM. However, those oils are much inferior in electrical insulation and hygroscopicity to a CFC12 refrigerating machine oil which is $10^{15}$ $\Omega$cm in volume resistivity and about 300 ppM in saturated water content.

Hydrofluorocarbons (HFC) are promising refrigerants that could replace CFC12 and HCFC22 which are on the list of materials that need be used less or totally disused in view of the environmental problems they have caused. Hydrofluorocarbons generally are more polar than CFC12 and HCFC22 and refrigerating oils that are highly soluble with such hydrofluorocarbons are also generally high in polarity. Hence, those oils which are soluble with hydrofluorocarbons tend to absorb moisture having high polarity. As a result, moisture will be carried over into the refrigerant circulation system and there is high likelihood for deterioration not only in electrical insulation but also in hydrolyzable materials such as refrigerating ester oils and those organic materials which are used in the compressor. If the deteriorated materials accumulate in the throttle mechanism, the performance of the refrigerant circulation system can potentially drop.

Hence, in assembling the refrigerant circulating system, it is necessary to shorten the period of time as much as possible for which the system is left open in the air. That is, the production of the refrigerant circulating system suffers from a number of problems in handling the components. Furthermore, the system involves the following problems: If a large quantity of water content enters the system, the formation of sludge is accelerated, or the water content is freezed to close the throttle mechanism, thus impeding the cooling operation.

In addition, the conventional HFC134a refrigerant circulating system is disadvantageous in the following points: In servicing the system for instance by repairing or replacing the components of the system, because of the high hygroscopicity of the refrigerating machine oil the water content of air is adsorbed on the refrigerating machine oil, so that the capillary tube or the expansion valve of the throttle mechanism is liable to be closed being freezed. In addition, the water content accelerates the hydrolysis of the ester oil, thus forming sludge. Furthermore, the water content accelerates the hydrolysis of polyethylene terephthalate employed as the insulating material of the motor, thus forming sludge. In order to eliminate the above-described difficulties accompanying the manufacture of the refrigerant circulating system or the service on it, it is necessary to more sufficiently remove the water content from the refrigerating machine oil and from the refrigerant cycling system than in the system using a CFC12 refrigerant. In addition, it is necessary to provide a drier in the refrigerant cycling system so as to complement the water content.

If a refrigerant is used together with a highly soluble refrigerating oil, the amount of the refrigerant that is dissolved in the refrigerating oil will increase rapidly as the temperature of the oil or the refrigerant in contact with it approaches the saturation point of the latter at the pressure of the atmosphere in which the refrigerating oil is placed. Since the refrigerating oil is diluted with a less viscous refrigerant, the above phenomenon will cause an extreme drop in the viscosity of the liquid being supplied to the sliding part and its lubrication characteristics will deteriorate to potentially cause seizure and other problems.

In the case where the bottom of the compressor to contain a highly soluble refrigerating oil is located on the high-pressure side, the solubility of the refrigerant will increase in the high-pressure atmosphere in the compressor where the areal pressure at the sliding part increases to require better lubrication characteristics and, hence, the viscosity of the liquid being supplied to the sliding part will drop and its lubrication characteristics will deteriorate to potentially cause seizure and other problems. Therefore, in the case under consideration (i.e., the bottom of the compressor to contain a highly soluble refrigerating oil is located on the high-pressure side), it has been common practice to use a viscous refrigerating oil in view of its dissolution under high pressure but this presents a problem in a low-pressure atmosphere. That is, the liquid to be supplied to the sliding part becomes extremely viscous due to small dissolution of the refrigerant and the mechanical loss caused by shear stress in the oil at the slide bearing or the like increases in its ratio to work of compression, leading to a lower efficiency.

Speaking also of the case of using a highly soluble refrigerating oil, the part of the oil which leaks out of the oil seal portion towards the suction side of the compression space contains a large amount of refrigerant, which will be expanded and compressed again in the compression cycle, causing loss and subsequent decrease in efficiency.

In the case where, in the conventional refrigerant circulating system, a refrigerant mixture containing at least an inflammable refrigerant is employed; more specifically, a refrigerant mixture containing an inflammable refrigerant HFC32 and nonflammable refrigerants HFC125 and HFC134a, is employed, large quantities of the refrigerants of the refrigerant mixture are dissolved in the refrigerating machine oil, because the latter is high in solubility. In this case, the quantities of the refrigerants dissolved in the refrigerating machine oil depend on the polarities of them. FIG. 16 indicates the solubilities of HFC32, HFC125 and HFC134a with respect to ester refrigerating machine oil. The refrigerants HFC125 and HFC134a relatively low in polarity are dissolved in the refrigerating machine oil more than the refrigerant HFC32 relatively high in polarity. As a result, the mixing ratio of the refrigerant mixture in the refrigerant circulating cycle which is not dissolved in the refrigerating machine oil yet, may change into a mixing ratio with which it is inflammable, because the rate of the refrigerant HFC32 which is inflammable when isolated is increased with respect to the mixing ratio which it had before being put in the refrigerant circulating cycle and was detected nonflammable. Hence, if the refrigerant mixture is discharged into the air by accident, and an igniting source is present near it, then it is ignited, and it may cause a fire.

A conventional refrigerant circulating system using a refrigerant mixture containing a plurality of refrigerants at least one of which is inflammable, employs an inflammable refrigerating machine oil. Hence, the system suffers from the following problem: When, because of some failure, the refrigerant mixture and the refrigerating machine oil are discharged in the form of mist into the air, and there is an igniting source near them, they may be ignited; that is, a fire may be started.

The term "inflammable refrigerant" as used herein is intended to mean the refrigerant which, upon touching an igniting source, is ignited if its temperature is in a practical temperature range, and its mixing ratio with air is a predetermined value. Examples of the inflammable refrigerant are, for instance, HFC32 (R32), HFC143a (R143a), HFC152a (R152a), propane (R290), butane (R600), pentane, and ammonia (R717). On the other hand, the term "nonflammable refrigerant" as used herein is intended to mean the refrigerant which is never ignited by an igniting source irrespective of its mixing ratio with air if its temperature is in a practical temperature range. In the above-described definitions, the practical temperature range is from $-40°$ C. to $+100°$ C.

SUMMARY OF THE INVENTION

Accordingly, an object of this invention is to solve the above-described problems accompanying a conventional refrigerant circulating system. More specifically, an object of the invention is to provide a refrigerant circulating system which is high both in electrical insulation and in moisture resistance, and which is high in reliability with the manufacture of the system and the service on it controlled to the conventional level.

Another object of the invention is to eliminate the above-described difficulty. More specifically, the object of the invention is to provide a refrigerant circulating system high in safety which is so designed that, even when the refrigerant is discharged into the air by accident and there is an igniting source near it, it is never ignited; that is, no fire is started thereby.

The invention also provides a refrigerant circulating system that will not allow the refrigerant or oil to be stagnant in any unsuitable areas in the system.

When using a hydrofluorocarbon-based refrigerant such as HFC134a or a refrigerant that is based on fluoroamine, fluoroether, fluoropropane, fluoroethane, fluorosilane or fluorosulfur, the refrigerant circulating system of the invention employs a refrigerating oil that has such a solubility that the weight factor of its dissolution in a liquid refrigerant is 0.5 to 7% under the condensing pressure and temperature conditions.

The refrigerant to be used in the invention is a mixture of refrigerants including an inflammable one.

The refrigerating oil to be used in the invention has a smaller specific gravity than said liquid refrigerant.

The refrigerating oil to be used in the invention is based on at least one member of the group consisting of alkylbenzenes, poly-α-olefins, paraffinic oils, naphthenic oils, polyphenylethers, polyphenylthioethers, and chlorinated paraffins.

The refrigerant to be used in the invention is a mixture of non-azeotropic refrigerants.

The refrigerating oil to be used in the present invention is such that, at least in the range of ambient temperatures for the use of the refrigerant circulating system, it assumes a smaller value of specific gravity than that of the liquid refrigerant as measured at the same temperature under the corresponding saturated vapor pressure, and the refrigerant is a non-azeotropic mixed refrigerant.

The accumulator as a part of the refrigerant circulating system of the invention has a lead-out pipe that leads the refrigerant out of the accumulator and which has a plurality of holes that are different in height as measured from the bottom of the accumulator.

The system of the invention is provided with a backflow preventing mechanism either between the evaporator and said compressor, or-between a four-way valve in the system and a pipe connected to the suction side of the compressor, or between said accumulator and said pipe connected to the suction side of the compressor.

The refrigerating oil to be used in the invention has a greater specific gravity than the liquid refrigerant.

The specific gravity of the refrigerating oil to be used in the invention is such that, in the temperature range of −20° C. to +60° C., it assumes a greater value than the specific gravity of the liquid refrigerant as measured at the same temperature under the corresponding saturated vapor pressure.

The refrigerating oil to be used in the invention is based on a chlorofluorocarbon polymer (CIFC) or a perfluorocarbon polymer (FC) or a perfluoroalkylpolyether or a modified silicone or a chlorinated aromatic compound.

The refrigerant to be used in the invention is a mixture of refrigerants at least one of which is inflammable.

In the invention, the bottom of the compressor to contain the refrigerating oil or said separate tank is located on the high-pressure side of said compressor or said refrigerant circulating system.

In the invention, means for separating the refrigerating oil having a greater specific gravity than the gaseous refrigerant is incorporated in said compressor so that the weight factor of the presence of the refrigerating oil being discharged from said compressor as part of the high-pressure gaseous refrigerant is no higher than the weight factor of dissolution of the refrigerating oil in the liquid refrigerant under the condensing pressure and temperature conditions.

In the invention, an oil separator is connected to the discharge side of the compressor.

In the invention, the refrigerating oil has no solubility or only slight solubility such that the weight factor of its dissolution in the liquid refrigerant under the evaporating pressure and temperature conditions is 0 to 2%.

The system of the invention comprises the interconnection of: a compressor that draws in a gaseous refrigerant optionally containing a liquid refrigerant while discharging it as a high-pressure gaseous refrigerant; a throttle mechanism for reducing the pressure of a liquid refrigerant optionally containing a gaseous refrigerant; a condenser for condensing the high-pressure gaseous refrigerant discharged from said compressor; and an evaporator for vaporizing the liquid refrigerant or gas-liquid phase refrigerant leaving said throttle mechanism, and in which system a refrigerating oil for performing the function of lubrication, sealing or the like is contained either within said compressor provided in said system or in a separate tank or the like, part or all of said refrigerating oil being exposed to the refrigerant atmosphere, and the system is characterized in that the refrigerant is a mixture of HFC32, HFC125 and HFC134a, that said refrigerating oil has such a solubility that the weight factor of dissolution thereof in the liquid refrigerant is 0.5 to 7% under the condensing pressure and temperature conditions, and that said refrigerating oil has a smaller value of specific gravity than said liquid refrigerant.

The refrigerant to be used in the invention is a non-azeotropic mixed refrigerant based on either a hydrofluorocarbon or at least one member of the group consisting of fluoroamine, fluoroether, fluoropropane, fluoroethane, fluorosilane or fluorosulfur, and the refrigerating oil is lighter than the liquid refrigerant and dissolves only slightly in the latter.

In the invention, a maximum of the temperature for separation into two layers, one being the refrigerant and the other being the refrigerating oil, is equal to or higher than the condensing temperature.

The invention uses a refrigerating oil having a saturated moisture content of no more than 300 ppM.

In the invention, a highly polar refrigerant is used in combination with an oil having low polarity to such an extent that it will not dissolve in an amount of more than 7% but will dissolve in an amount of 0.5 to 7%, and this contributes to the fabrication of a refrigerant circulating system that has low moisture absorption and which features effective oil return.

In the invention, a refrigerant that is inflammable when used alone is mixed with a nonflammable refrigerant and, further, on account of very slight oil dissolution, the mixed refrigerant will not vary in composition to become inflammable.

The refrigerating oil to be used in the invention is lighter than the liquid refrigerant and may be composed of a substance of high atomic weight; hence, the oil can be produced at low cost.

Refrigerating oils that are based on alkylbenzenes, poly-α-olefins, paraffinic oils, naphthenic oils, polyphenylethers, polyphenylthioethers, or chlorinated paraffins have high viscosities at elevated pressures, provide high reliability in the sliding part and exhibit high chemical stability. They are advantageously combined with refrigerants having no atom of a good extreme-pressure property such as chlorine, which are poor in self-lubricating property.

The use of a non-azeotropic mixed refrigerant permits only limited transfer of the refrigerant into the compressor during prolonged system shutdown.

The accumulator having a plurality of oil return holes enables the recovery of the oil that has been separated within the accumulator.

Since the check valve is provided on the suction pipe, there is no possibility that the low-viscosity liquid refrigerant which has been separated within the compressor will leak to the low-pressure side to cause performance deterioration.

The oil having a greater specific gravity than the liquid refrigerant has the advantage that it is easily returned from the accumulator.

The refrigerant circulating system of the invention has another advantage in that even if the refrigerant is released into the air atmosphere on account of a certain trouble or the like and even if there is an ignitable heat source nearby, the refrigerant will not catch fire and, as a result, one can avoid hazards such as the occurrence of a disastrous fire.

The system has the oil reservoir located on the high-pressure side or the oil separating means or oil separator is provided in the compressor and, hence, the carryover of the oil into the circuit can be suppressed.

A maximum of the temperature for separation into two layers, one being the refrigerating oil and the other being the liquid refrigerant, is equal to or higher than the condensing temperature. The use of such refrigerating oil having low solubility assures that only a small amount of the refrigerant will dissolve in the refrigerating oil even if the temperature of the refrigerating oil or the refrigerant in contact with it approaches the saturated temperature of the refrigerant at the pressure of the atmosphere in which the refrigerating oil is placed.

DETAILED DESCRIPTION OF THE PREFERRED EMBODIMENTS

Embodiment 1

Figure 1:
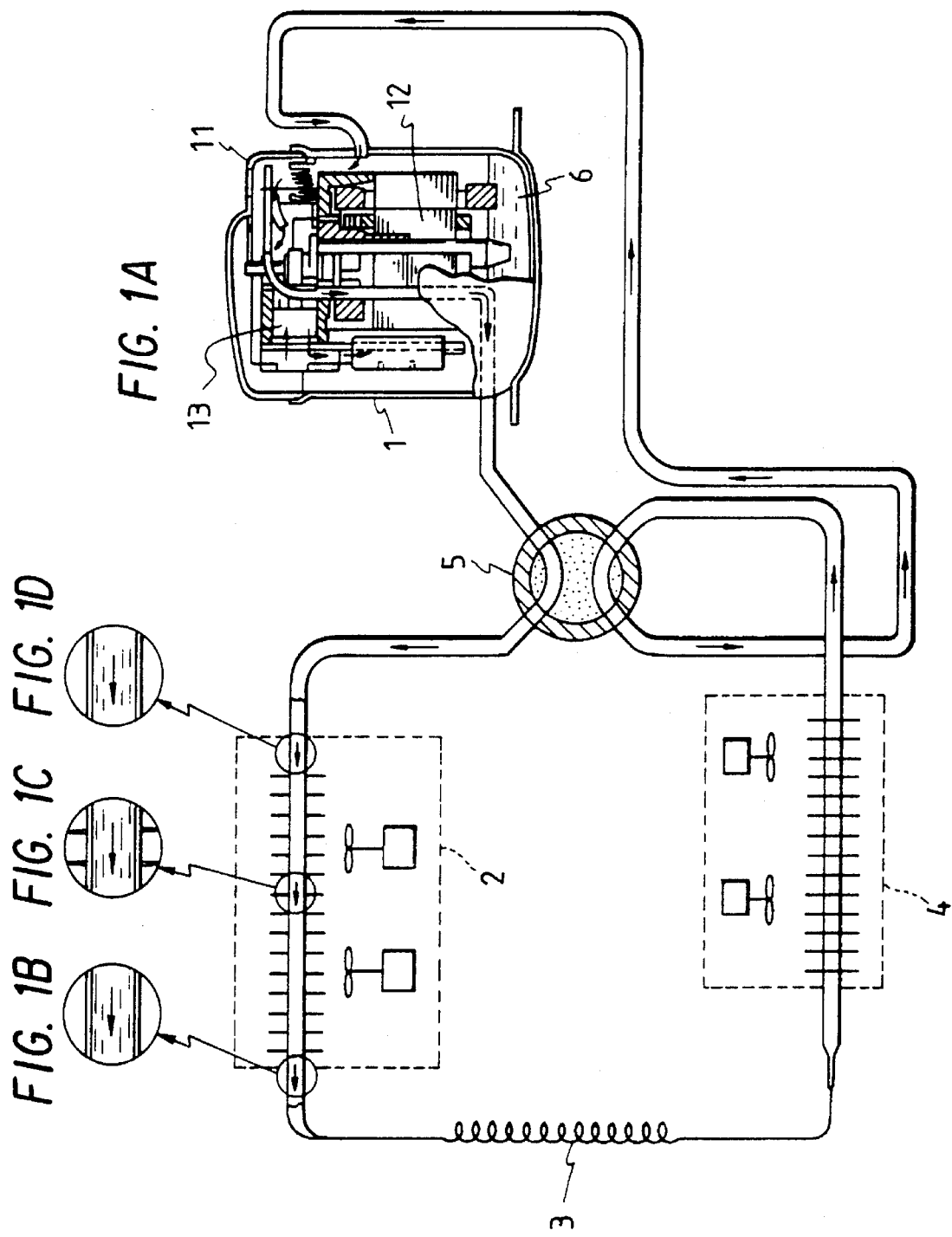
FIGS. 1A, 1B, 1C and 1D are explanatory diagrams showing the arrangement of a refrigerant circulating system which constitutes a first embodiment of this invention.
Figure 2:
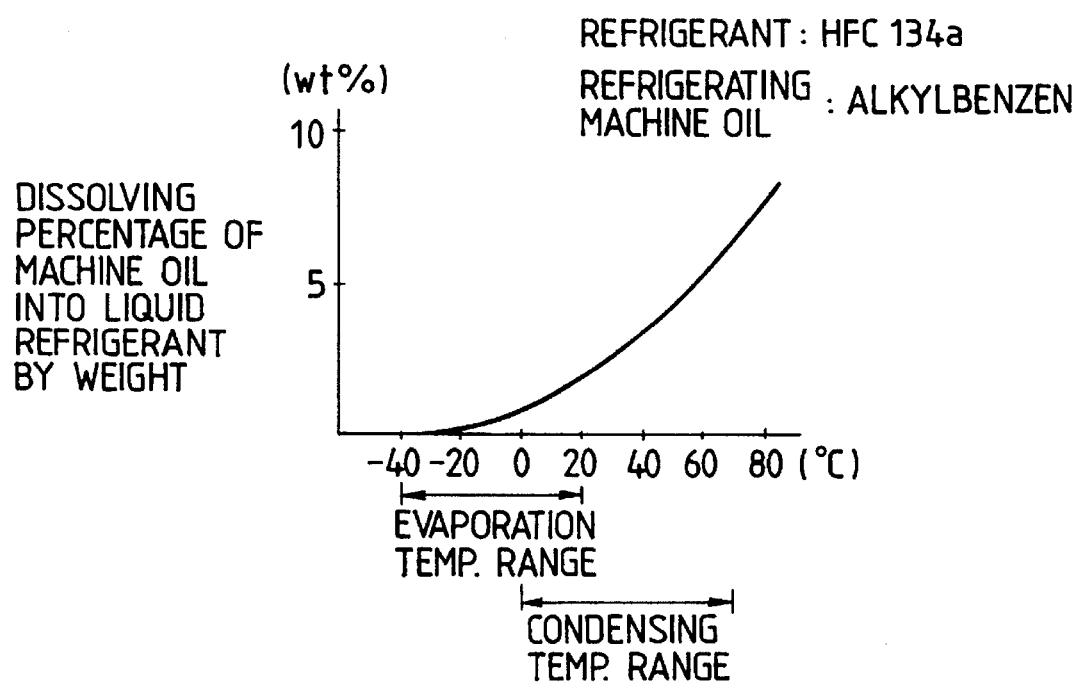
FIG. 2 is a graphical representation showing the percent solubility by weight of a refrigerating oil in a liquid refrigerant in the first embodiment.

A first embodiment of this invention will be described with reference to FIGS. 1A–1D and 2. FIGS. 1A–1D are explanatory diagrams showing the arrangement of a refrigerant circulating system which is applicable, for instance, to a small capacity air conditioner. In FIG. 1A, reference numeral 1 designates a compressor for compressing refrigerant gas; 2, a condenser for condensing a high pressure refrigerant gas discharged from the compressor 1; 3, a throttle mechanism; 4, an evaporator; 5, a 4-way valve having a function of reversing the direction of flow of a refrigerant; and 6, a refrigerating machine oil kept in the compressor 1 to lubricate the slide parts of the compressor 1 and to seal the compressing chamber thereof. FIG. 2 is a graphical representation indicating the dissolving percentages by weight of a refrigerating machine oil alkyl benzene with a liquid refrigerant HFC134a in the embodiment. That is, it has a solubility of 0.5 to 7% by weight with the liquid refrigerant in the condenser, and 0 to 2% by weight with the liquid refrigerant in the evaporator.

Now, the behaviors of the refrigerant and the oil will be described. A part of the refrigerating machine oil used for sealing the compressing chamber is mixed with the refrigerant compressed by the compressor 1, thus being discharged from the latter 1 into the condenser 2. In the condenser 2, the pipe in which a refrigerant gas flows is so determined in diameter that the flow rate of the refrigerant gas is high enough to convey the refrigerating machine oil downstream. In the condenser 2, the refrigerant is condensed on the inner surface of the pipe. The refrigerant thus condensed is larger in thickness towards downstream, and therefore, in the pipe, the central space in which the gas flows is decreased accordingly. Hence, the flow rate of the gas is gradually decreased, and its limited flow rate is maintained which is high enough to convey the refrigerating machine oil and the refrigerant liquid condensed on the inner surface of the pipe downstream. Near the rear end of the pipe in the condenser 2, a larger part of the refrigerant is liquified, as a result of which the flow rate in the pipe is greatly decreased. However, since the solubility of the refrigerating machine oil with the condensed liquid refrigerant is low, the refrigerating machine oil is conveyed downstream being dissolved in the liquid refrigerant. At the inlet of the throttle mechanism 3, the refrigerant is substantially liquified, and the refrigerating machine oil low in solubility is conveyed downstream together with the liquid refrigerant. Flowing downstream of the throttle mechanism 3, the refrigerant is greatly decreased both in temperature and in pressure, and therefore the refrigerating machine oil is slightly soluble with the liquid refrigerant, or non-soluble with it.

On the other hand, because of gasification of a part of the liquid refrigerant which is located downstream of the throttle mechanism 3, the flow rate of the refrigerant is abruptly increased, and the refrigerating machine oil is conveyed downstream. In the evaporator 4, the pipe is so determined in diameter that the refrigerant gas formed by the pressure drop of the throttle mechanism sufficiently conveys the liquid refrigerant and the refrigerating machine oil downstream. Hence, in spite of the non-solubility or low solubility of the refrigerating machine oil with the liquid refrigerant, the refrigerating machine oil is conveyed downstream. In the evaporator 4, the refrigerant is gasified as it flows downstream; that is, the flow rate of the refrigerant gas is increased. As a result, with the flow rate of the refrigerant gas maintained much higher than the limited flow rate which is required for conveyance of the refrigerating machine oil, the refrigerant is absorbed into the compressor 1, and the refrigerating machine oil thus conveyed meets the refrigerating machine oil 6 kept in the bottom of the compressor 1.

Hence, the refrigerating machine oil 6 is maintained in the compressor 1 at all times, thus lubricating and sealing the latter sufficiently.

In the refrigerant circulating system constructed as described above, a refrigerant essentially containing hydrofluorocarbon, and a refrigerating machine oil essentially containing alkyl benzene or polyalphaolefin may be used. Therefore, in the system, the refrigerating machine oil is substantially equal in hygroscopicity and electrical insulation to the mineral oil in the conventional refrigerating system. In addition, in assembling the refrigerant circulating system and in servicing it, the moisture control may be made similarly as in the case of the conventional refrigerant circulating system using the refrigerant CFC12.

Control means, namely, the 4-way valve is provided in a connecting section where a connecting pipe provided between the evaporator and the compressor, and a connecting pipe provided between the compressor and the condenser are collected. By switching the flow paths in the 4-way valve, the direction of circulation of the refrigerant can be reversed, and the functions of the evaporator and the condenser can be swapped with each other.

The refrigerant circulating system of the invention designed as described above mainly uses a refrigerant which essentially contains hydrofluorocarbon, and a refrigerating machine oil which shows solubility with a liquid refrigerant when condensed and non-solubility or low solubility when evaporated. Therefore, the system is high in electrical insulation and in moisture resistance, and is high in reliability since the oil is smoothly returned into the compressor.

The compressor in refrigerant circulating systems generally has a refrigerating oil carried over into the refrigerant circuit in an amount of at least 0.5% by weight of the circulating refrigerant. Therefore, if the refrigerating oil used is such that the weight factor of dissolution in a liquid refrigerant is 0.5% or less under the condensing pressure and temperature conditions, the excess refrigerating oil which cannot dissolve in the liquid refrigerant will stay near the rear end of the pipe through the condenser in which the refrigerant is liquefied to flow at a very slow rate and, as a result, the refrigerating oil will be depleted in the compression space.

When using refrigerants of high polarity such as hydrofluorocarbons, one must also use refrigerating oils of high polarity in order to insure good solubility between the two components so that the refrigerating oils will not stay in the liquid refrigerant near the rear end of the pipe through the condenser. However, refrigerating oils of high polarity which have solubilities of at least 7% are so high in their ability to absorb moisture that there is high likelihood for the refrigerating oils to be carried over in large amounts into the refrigerating circuit, which can potentially deteriorate electrical insulation or impair the chemical stability of refrigerants, refrigerating oils and even the insulator used in the motor.

The present invention has been accomplished in order to solve these problems of the prior art and it is characterized by using a refrigerating oil having such a solubility that the weight factor of dissolution in a liquid refrigerant is in a range of 0.5 to 7% under the condensing pressure and temperature conditions. In the invention, the refrigerating oil that has been carried over from the compressor into the refrigerant circuit can positively be returned into the compressor. As a further advantage, the refrigerating oil is low in moisture absorption and contributes to the production of a highly reliable refrigerant circulating system.

The area in the system where there is the possibility for the stagnancy of the refrigerating oil to occur is the piping that extends from part of the condenser (usually in the second half and on the side much closer to the exit but if the circulation of the refrigerant is low, it may sometimes occur that the sole presence of the liquid already starts in areas fairly upstream the condenser) to the throttle and there has been potential hazard of oil depletion in the compressor in the case where its oil content decreases and where the length of the piping from the exit of the condenser to the throttle is great.

The condensing pressure is determined by the condensing temperature condition and the refrigerant characteristics. The condensing temperature is determined not only by the temperature of the atmosphere where the condenser of the refrigerant circulating system of interest is placed but also by the balance between the performance (heat-exchange efficiency) of the condenser and the latent heat of the refrigerant.

For example, refrigerators typically are used in atmospheres having temperatures of 0° to 45° C. and, in that case, the condensing temperature (depending on the performance of the condenser in the refrigerator) is 0° C. to 15° C. at an atmosphere's temperature of 0° C. and 45° C. to 68° C. at an atmosphere's temperature of 45° C. On the other hand, the condensing pressure in that case is determined by the characteristics of the refrigerant used; if R134a is used as the refrigerant, the condensing pressure is 1.96 $kg/cm^2G$ at a condensing temperature of 0° C. and 19.6 $kg/cm^2G$ at a condensing temperature of 68° C.

Whether the polarity is high or low is a matter of relativism. In the context of the invention, hydrofluorocarbons and "third generation" refrigerants such as fluoroamine, fluoroether, fluoropropane, fluoroethane, fluorosilane and fluorosulfur are more polar than CFC12 or HCFC22. As for refrigerating oils, alkylbenzenes, poly-α-olefins, etc., are less polar than ester oils and PAG in the prior art.

Speaking of the ease of dissolution generally, any two substances having high polarity or low polarity are highly soluble in each other. Hence, hydrofluorocarbons of comparatively high polarity will dissolve only ester oils, PAG and like substances having high polarity. Water is a substance of comparatively high polarity and, accordingly, it will readily dissolve in ester oils and PAG which also have high polarity. In other words, oils that will easily dissolve in hydrofluorocarbons have great ability to absorb moisture. Conversely, oils that will not easily dissolve in hydrofluorocarbons have small ability to absorb moisture.

When using refrigerants of high polarity such as hydrofluorocarbons, one must also use refrigerating oils of high polarity in order to insure good solubility between the two components so that the refrigerating oils will not stay in the liquid refrigerant near the rear end of the pipe through the condenser. However, refrigerating oils of high polarity which have solubilities of at least 7% are so high in their ability to absorb moisture that there is high likelihood for the refrigerating oils to be carried over in large amounts into the refrigerant circuit, which can potentially deteriorate electrical insulation or impair the chemical stability of refrigerants, refrigerating oils and even the insulator used in the motor.

Speaking of polarity, a certain substance is said to have polarity if the center of gravity of a positive charge in the molecule does not agree with that of a negative charge. A certain chemical bond also is said to have polarity if there is unevenness in positive or negative charges. Electric polarity is generally meant by the term "polarity". With polarity, there is high probability for easy access to ions of opposite sign or atoms of polar bond, thereby causing effects on adsorption, reaction rate, dielectric constant, etc.

As already mentioned, hydrofluorocarbons (HFC) or refrigerants such as fluoroamine, fluoroether, fluoropropane, fluoroethane, fluorosilane and fluorosulfur are promising refrigerants that could replace CFC12 and HCFC22 which are on the list of materials that need be used less or totally disused in view of the environmental problems they have caused. Hydrofluorocarbons generally are more polar than CFC12 and HCFC22 and refrigerating oils that have low solubility with hydrofluorocarbons are generally low in polarity. Hence, those refrigerating oils which are low in solubility with refrigerants having high polarity such as hydrofluorocarbons are hard to adsorb moisture having high polarity. As a result, the carryover of moisture into the refrigerant circulating system is suppressed and there is less likelihood for deterioration not only in electrical insulation but also in hydrolyzable materials such as those organic materials which are used in the compressor, whereby one can prevent deterioration in the performance of the refrigerant circulating system which would otherwise occur if the deteriorated materials accumulated in the throttle mechanism.

Hydrofluorocarbons (HFC) are promising refrigerants that could replace CFC12 and HCFC22 which are on the list of materials that need be used less or totally disused in view of the environmental problems they have caused. However, such hydrofluorocarbons do not contain chlorine atoms in the molecule, so unlike CFC12 and HCFC22 which have chlorine molecules, they are not expected to offer such as advantage that the sliding part of the compressor which is placed under boundary lubrication conditions forms a compound such as iron chloride on the metal surface, thereby improving in wear resistance.

Further, ester oils having high solubility with hydrofluorocarbons have low extreme pressure quality (high-pressure viscosity index) and, hence, increase the chance for the sliding part of the compressor to be subjected to the boundary lubrication conditions, as compared to paraffinic or naphthenic oils which have heretofore been employed in the refrigerant circulating system that uses CFC12 or HCFC22 as the refrigerant.

Therefore, refrigerant circulating systems that use hydrofluorocarbons as refrigerants, particularly in the case where soluble ester oils are employed as refrigerating oils, have encountered a problem with the wear resistance of the sliding part of the compressor.

The present invention has been described above with reference to an example that relates to the use of a hydrofluorocarbon-based single or mixed refrigerant. It should, however, be noted that when estimated from their molecular structures, "third generation refrigerants" including fluoroamine, fluoroether, fluoropropane, fluoroethane, fluorosilane and fluorosulfur are all considered to have high polarity, too, and that they are anticipated to exhibit comparable actions and advantages to hydrofluorocarbons.

Further, the refrigerant circulating system of the invention uses a refrigerating oil having low solubility with refrigerants and, hence, the oil is low in polarity and hard to adsorb moisture having high polarity; therefore, it effectively prevents not only the deterioration in electrical insulation but also the drop in the performance of the system due to the accumulation of deteriorated materials in the throttle mechanism.

The refrigerant circulating system of the invention which uses the refrigerating oil having low solubility offers another advantage in that the viscosity of the liquid being supplied to the sliding part is maintained at a sufficiently high level to reduce the chance of seizure and other troubles in the sliding part, thereby improving the reliability of the system.

Embodiment 2

Figure 3:
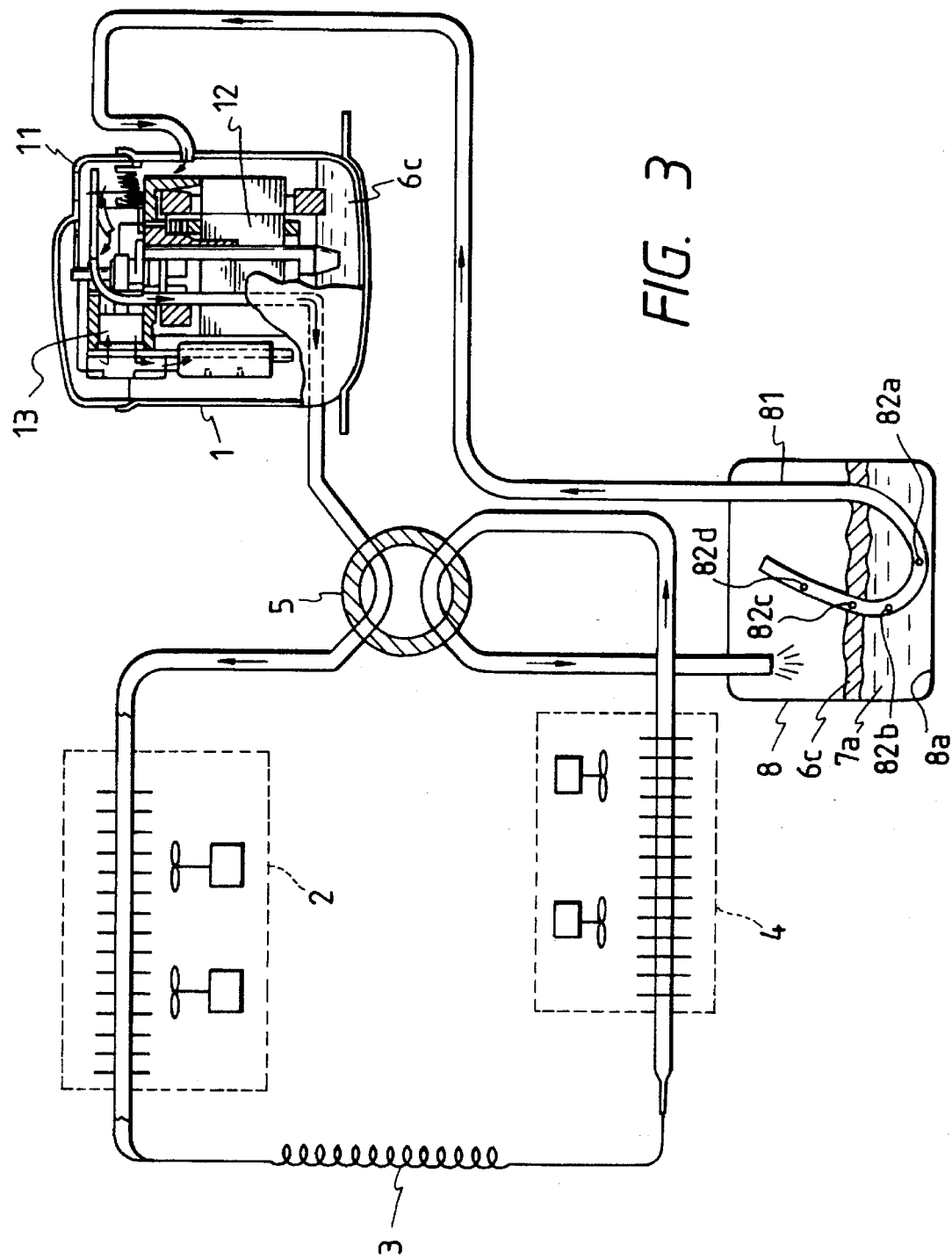
FIG. 3 is an explanatory diagram showing the arrangement of a refrigerant circulating system which constitutes a second embodiment of the invention.

A second embodiment of the invention will be described with reference to FIG. 3. FIG. 3 shows an example of a refrigerant circulating system which is applicable, for instance, to a large capacity air conditioner. In FIG. 3, reference numeral 1 designates a compressor for compressing a refrigerant gas; 2, a condenser for condensing a high-pressure refrigerant gas discharged from the compressor 1; 3, a capillary tube; 4, an evaporator; 8, a refrigerant liquid pooling accumulator having a function of adjusting the quantity of refrigerant; 6C, a refrigerating machine oil kept in the compressor 1 to lubricate the sliding parts of the compressor 1 and to seal the compressing chamber thereof; and 5, a 4-way valve for reversing the direction of flow of the refrigerant.

When the refrigerating machine oil 6c is at the evaporating pressure and at the evaporating temperature, it shows no solubility with a liquid refrigerant 7a or is low in solubility. Therefore, a layer of the refrigerating machine oil 6c is formed over the liquid refrigerant 7a. A lead-out pipe 81 is provided inside the accumulator 8, to move the refrigerant out of the accumulator 8. The lead-out pipe 81 has oil returning holes 82a, 82b, 82c and 82d different in height as measured from the bottom 8a of the accumulator 8, so that the refrigerating machine oil 6c in the accumulator 8 is positively returned into the compressor 10

Embodiment 3

Figure 4:
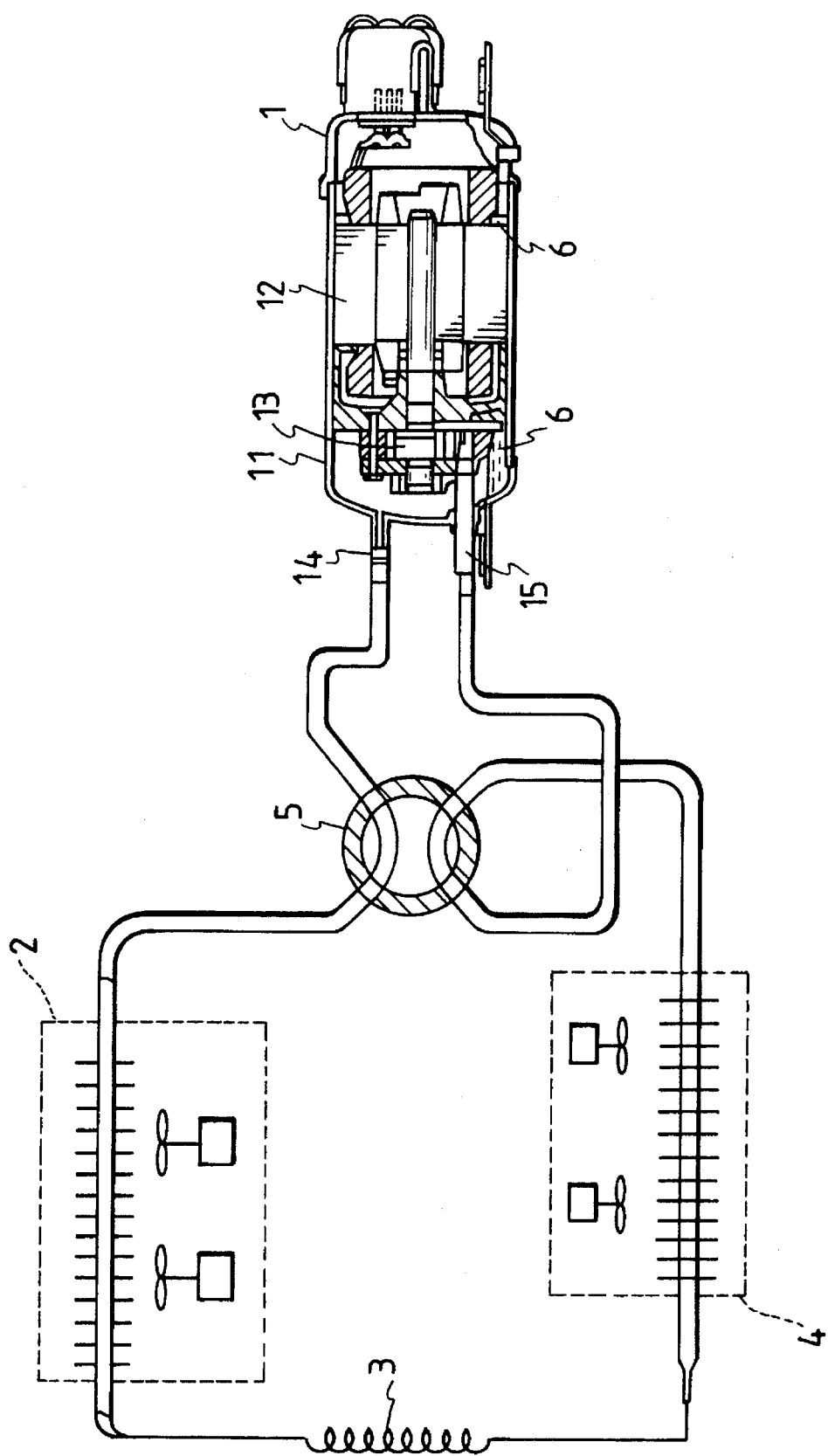
FIG. 4 is an explanatory diagram showing the arrangement of a refrigerant circulating system which constitutes a third embodiment of the invention.

A third embodiment of the invention will be described with reference to FIG. 4. FIG. 4 is an explanatory diagram showing the arrangement of a refrigerant circulating system which is applicable, for instance, to an air conditioner which is installed on a window of a room with its inside and outside parts as one unit. In the embodiment, the refrigerant pressurized by the compressing mechanism 1 of a compressor 1 is discharged into the closed container 11 of the compressor 1, and then led out of it through a discharge pipe 14. Hence, the refrigerating machine oil 6 stored in the bottom of the compressor 1 is in a refrigerant space on the high pressure side, and the refrigerating machine oil contained in the discharged refrigerant gas drops by its own weight while moving from the closed container to the discharge pipe 14. Accordingly, the mixing percentage of the refrigerating machine oil in the refrigerant gas discharged through the discharge pipe 14 is extremely low, and its solubility is lower than the solubility of the refrigerating machine oil with the liquid refrigerant at the condensing pressure. Therefore, the refrigerating machine oil discharged from the compressor 1 is positively returned into the latter 1.

The refrigerant circulating system of the invention insures that the refrigerating oil which is used for compressor lubrication, sealing and other purposes will flow out in small quantities to the condenser, throttle mechanism and evaporator; at the same time, the compressor will discharge only a limited amount of oil and, hence, the refrigerating oil that has flowed out can positively be returned to the compressor, thereby preventing the drop in the heat-exchange efficiency of the condenser and the evaporator.

Thus, even in the case where the bottom of the compressor to contain refrigerating oils is located on the high-pressure side, the use of less soluble refrigerating oil solves the aforementioned problem of the prior art since there occurs only a small change in viscosity due to the difference in the solubility of the refrigerant in the oil. Therefore, by selecting an appropriate viscosity for the lubricating oil, not only the reliability of the sliding part of the compressor in the case where the atmosphere in which the oil is placed has high pressure but also the efficiency in the case of low pressure are assured.

Embodiment 4

Figure 5:
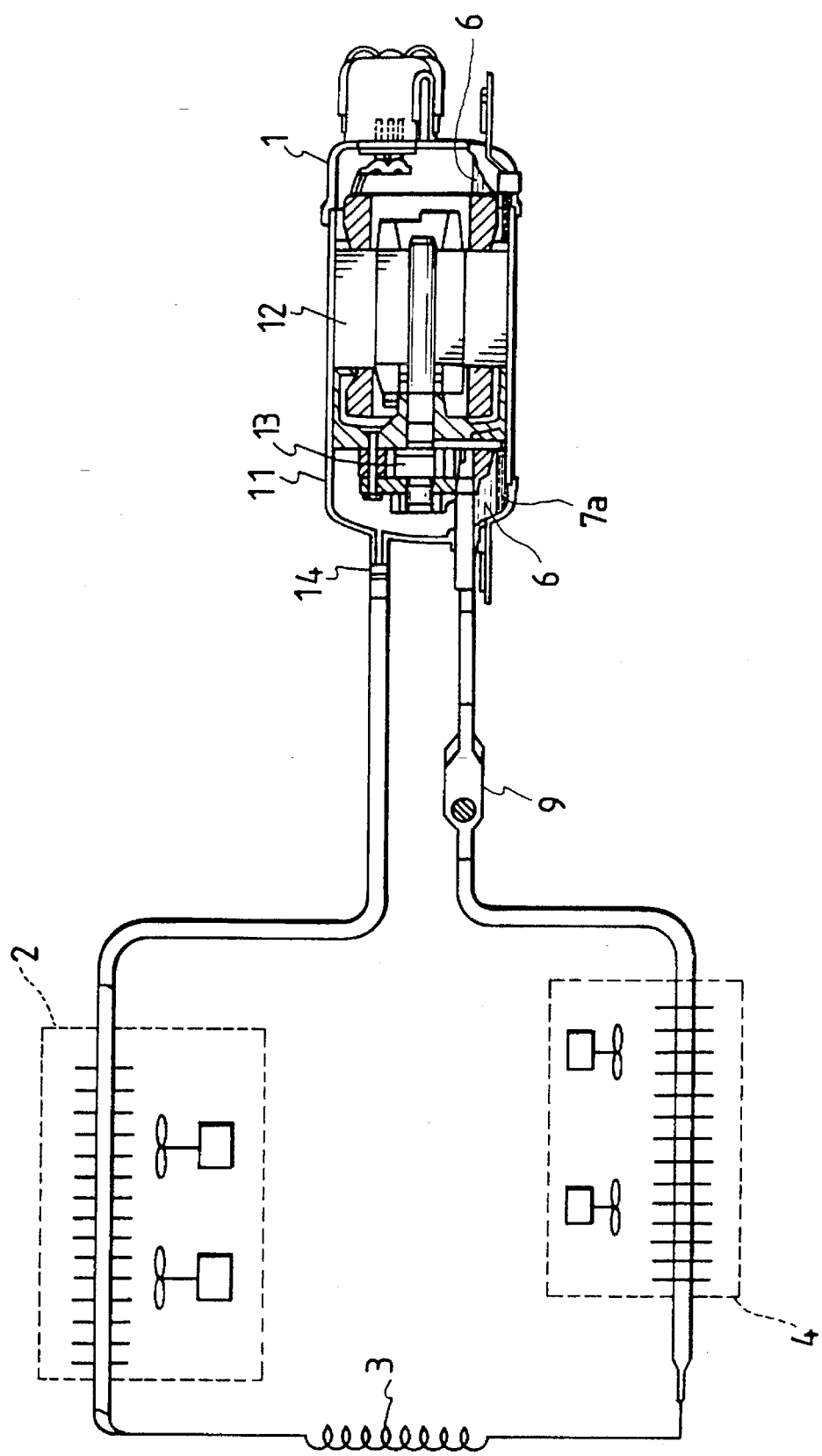
FIG. 5 is an explanatory diagram showing the arrangement of a refrigerant circulating system which constitutes a fourth embodiment of the invention.

A fourth embodiment of the invention will be described with reference to FIG. 5. FIG. 5 is an explanatory diagram showing the arrangement of a refrigerant circulating system which is applicable, for instance, to a refrigerator. In FIG. 5, reference numeral 9 designates a check valve which is connected between a compressor 1 and an evaporator 4. The refrigerant and the refrigerating machine oil are substantially separated from each other, and therefore the viscosity of the refrigerant only is lower than that of the refrigerant in which the refrigerating machine oil is dissolved. Hence, when the compressor 1 is not in operation, the refrigerant not mixed is low in viscosity, and high in fluidity, and therefore a larger part of the liquid refrigerant 7a collected above the refrigerating machine oil 6 by separation is allowed to flow back to the evaporator 4 through the gaps of the sliding parts in the compressor 1. As a result, the temperature of the evaporator 4 is increased, and the power consumption of the refrigerator is increased. In order to eliminate this difficulty, the check valve 9 is employed. That is, the check valve 9 is connected between the compressor 1 and the evaporator 4 to suppress the back flow of the refrigerant, thereby to prevent the rise in temperature of the evaporator 4. It goes without saying that the check valve 9 may be replaced with any means for preventing the back flow of the refrigerant.

Embodiment 5

Figure 6:
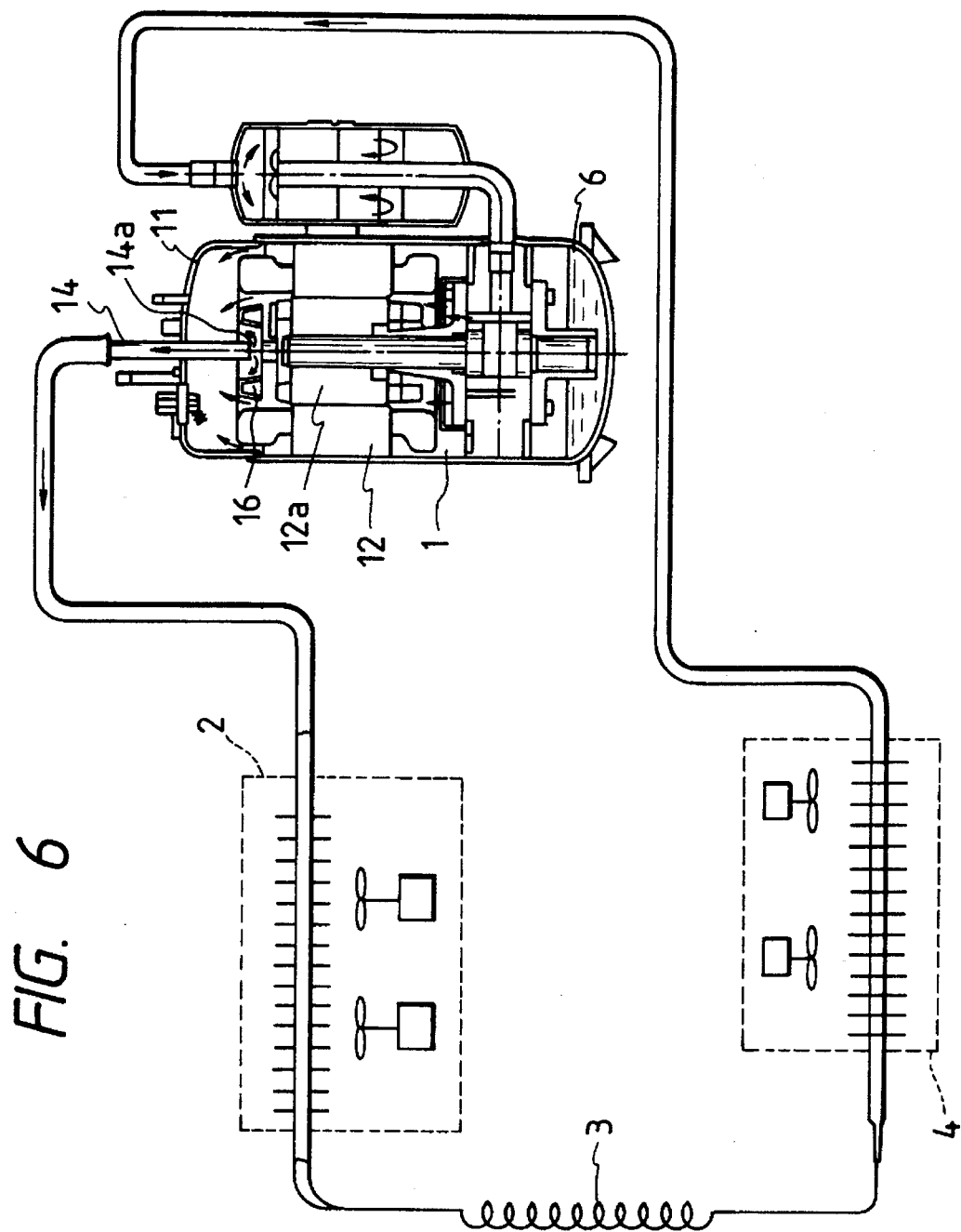
FIG. 6 is an explanatory diagram showing the arrangement of a refrigerant circulating system which constitutes a fifth embodiment of the invention.

A fifth embodiment of the invention will be described with reference to FIG. 6. FIG. 6 is an explanatory diagram showing the arrangement of a refrigerant circulating system which is applicable, for instance, to an air conditioner used only for cooling a room. The refrigerant pressurized by the compressing mechanism 3 of a compressor 1 is discharged into the closed container 11 thereof, and then led out of the compressor 1 through a discharge pipe 14. The refrigerant gas inlet end 14a of the discharge pipe 14 is confronted with the center of a rotary fan 16 which is mounted on the upper end of the rotor 12a of an electric motor 12. At the refrigerant gas inlet end, the refrigerating machine oil larger in specific gravity is scattered around by the centrifugal force. Hence, the mixing percentage of the refrigerating machine oil in the refrigerant gas discharged through the discharge pipe 14a is extremely low, and its solubility is much lower than the solubility of the refrigerating machine oil with the liquid refrigerant at the condensing pressure. Therefore, the refrigerating machine oil discharged from the compressor 1 is positively returned into the latter 1.

Embodiment 6

Figure 7:
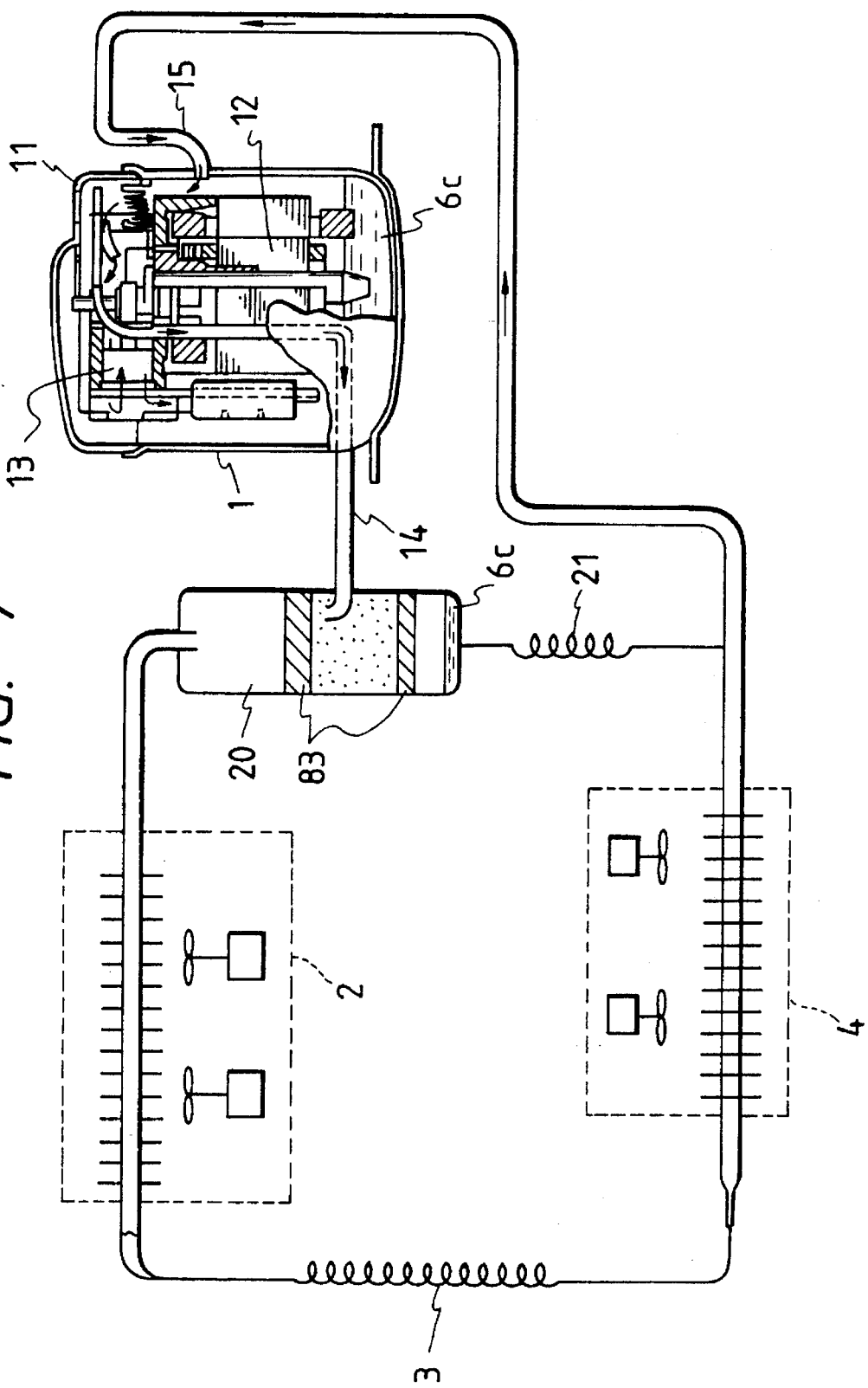
FIG. 7 is an explanatory diagram showing the arrangement of a refrigerant circulating system which constitutes a sixth embodiment of the invention.

A sixth embodiment of the invention will be described with reference to FIG. 7. FIG. 7 is an explanatory diagram showing the arrangement of a refrigerant circulating system which is applicable, for instance, to a refrigerator. When the refrigerant gas discharged from a compressor 1 is conveyed through an oil separator 20 to a pipe connected to a condenser 2, the refrigerating machine oil is separated from it by means of nets 83 provided in the oil separator 20. The refrigerating machine oil thus separated is sucked to return through an oil returning pipe 21 extended from the oil separator and through a suction pipe 15 to the compressor 1, thus positively lubricating and sealing the compressor 1. The mixing percentage of the refrigerating machine oil in the refrigerant gas which goes into the condenser 2 is extremely low, and its solubility is lower than that of the refrigerating machine oil with the liquid refrigerant at the condensing pressure. Therefore, the system is free from the difficulty that the refrigerating machine oil is held upstream of the throttle mechanism, thus adversely affecting the operation of the system. The net may be so provided as to surround the end portion of the discharge pipe 14 in the oil separator 20.

Embodiment 7

Figure 8:
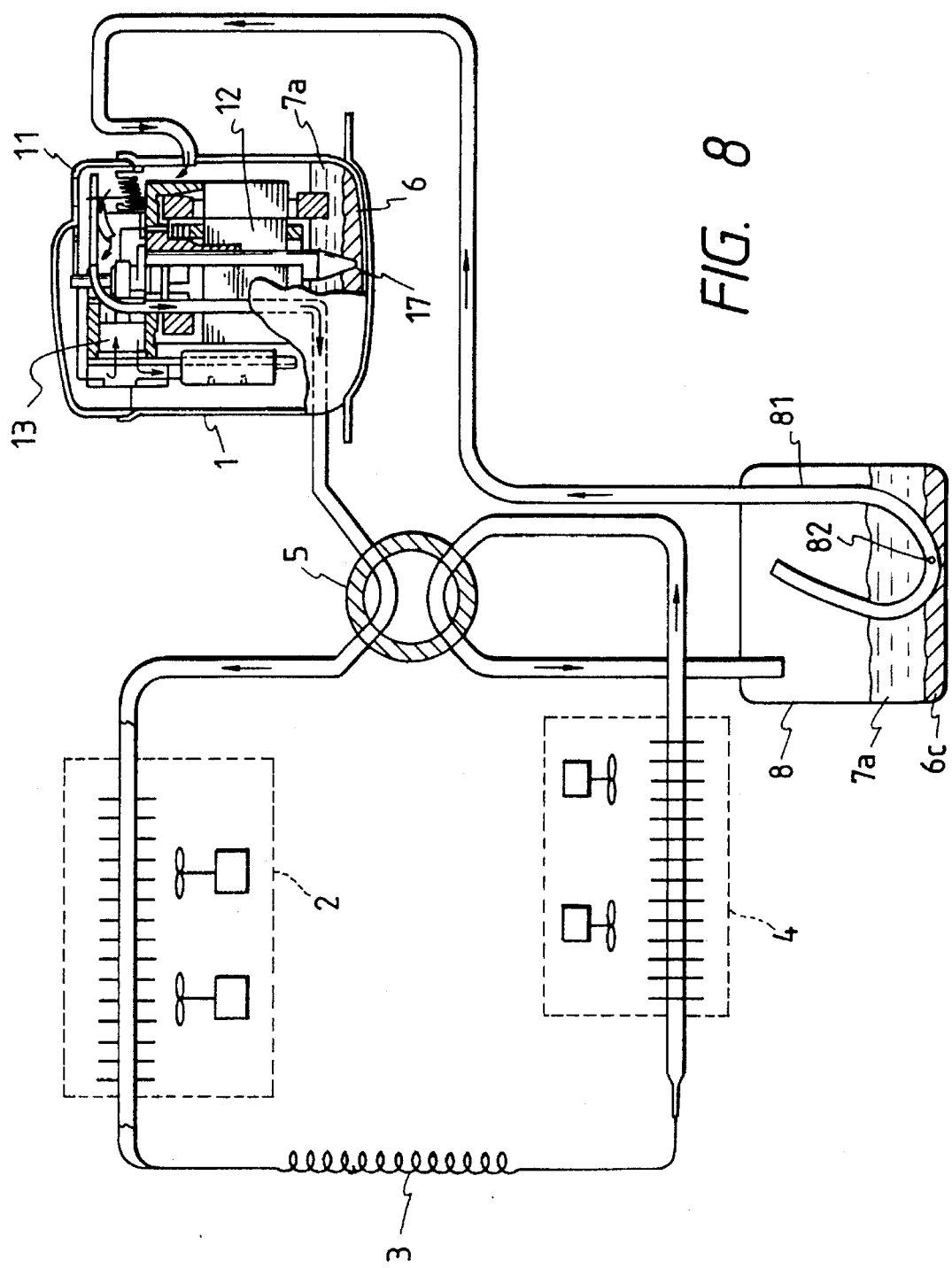
FIG. 8 is an explanatory diagram showing the arrangement of a refrigerant circulating system which constitutes a seventh embodiment of the invention.

A seventh embodiment of the invention will be described with reference to FIG. 8. FIG. 8 is an explanatory diagram showing the arrangement of a refrigerant circulating system which is applicable, for instance, to an air conditioner. The refrigerating machine oil 6, such as chlorofluoro-carbon, in a compressor 1 is under the evaporating pressure, and the oil 6 and the refrigerating machine oil 6c in an accumulator 8 are scarcely dissolved in a liquid refrigerant such as HFC134a. The specific weight of the refrigerating machine oils 6 and 6c is 1.9 times as large as that of the liquid refrigerant 7a. Therefore, the refrigerating machine oil (6 and 6c) is kept in the form of a layer in the bottom of the accumulator 8 in such a manner that the layer is separated from a layer of liquid refrigerant 7a. Hence, even when a large quantity of liquid refrigerant 7a is collected in the accumulator 8, the refrigerating machine oil is positively returned through the oil returning hole 82 of a lead-out pipe 81 into the compressor 1. In the case where the liquid refrigerant 7a is returned into the compressor 1, it is stored in the form of a layer above a layer of refrigerating machine oil 6 kept therein. Therefore, only the refrigerating machine oil is sucked up through an oil sucking hole 17 in the lowest end portion of the compressor, thus lubricating and sealing the latter.

In the system, the refrigerant essentially contains hydrofluorocarbon, and the refrigerating machine oil essentially contains chlorofluorocarbon polymer, perfluorocarbon polymer, perfluoroalkylpolyether, denatured silicone, chlorinated aromatic compound.

Embodiment 8

An eighth embodiment of the invention will be described with reference to FIG. 9.

In the case where a refrigerant mixture is employed which contains a plurality of refrigerants at least one of which is inflammable; more specifically, in the case where a refrigerant mixture is employed which consists of a refrigerant HFC32 which is flammable when isolated, and refrigerants HFC 125 and HFC134a which are non-flammable when isolated, a large quantity of refrigerant will never dissolved in the refrigerating machine oil, because, in the refrigerant circulating system of the invention, the refrigerating machine oil is non-soluble or slightly soluble with the refrigerant mixture. Hence, the mixing ratio of the refrigerant mixture in the refrigerant circulating cycle which is not dissolved in the refrigerating machine oil yet, scarcely changes from the mixing ratio of the mixture which it had before put in the refrigerant circulating cycle and was detected nonflammable, and will not change into the mixing ratio with which it is flammable. Therefore, even if the refrigerant mixture is discharged into the air by accident, and an igniting source is present near it, it will never be ignited, and accordingly no fire is started thereby.

Figure 9:
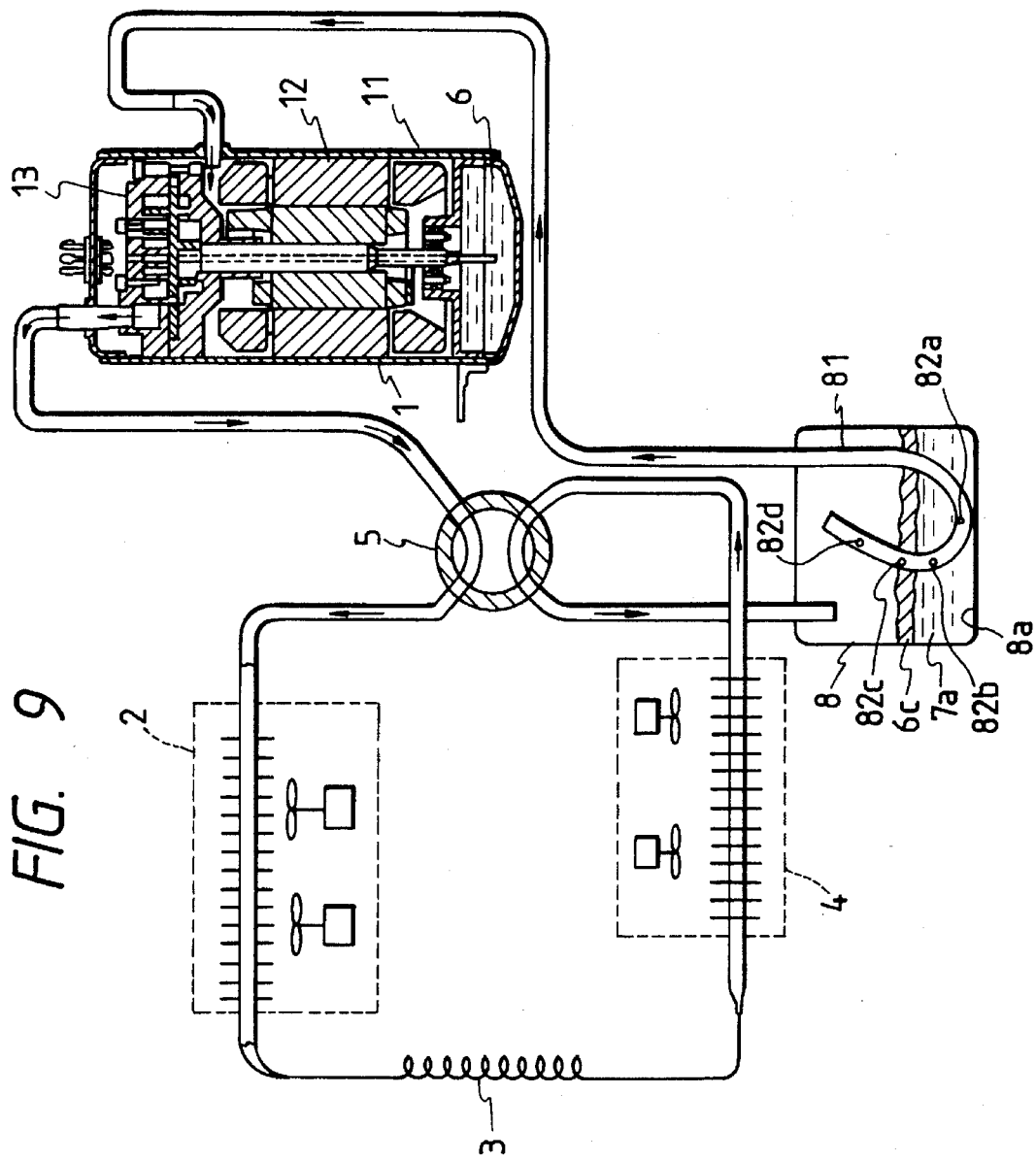
FIG. 9 is an explanatory diagram showing the arrangement of a refrigerant circulating system which constitutes a eighth embodiment of the invention.

FIG. 9 shows one example of a refrigerant circulating system which is applied, for instance, to an air conditioner. The refrigerant mixture sucked into a compressor 1, after cooling an electric motor 12 in a closed container 11, is compressed by a compressing mechanism 13, and discharged through a 4-way valve 5 into a condenser 2. In this operation, the refrigerating machine oil 6 pooled in the bottom of the closed container 11 is exposed to the atmosphere of the refrigerant mixture sucked into the compressor;however, the refrigerant mixture is scarcely dissolved into the refrigerating machine oil 6, because the latter 6 is zero or extremely low in solubility.

Embodiment 9

A ninth embodiment of the invention will be described with reference to FIG. 10.

In the case where a refrigerant mixture is employed which contains a plurality of refrigerants at least one of which is inflammable; more specifically, in the case where a refrigerant mixture is employed which consists of a refrigerant HFC32 which is flammable when isolated, and refrigerants HFC 125 and HFC134a which are non-flammable when isolated, the refrigerant mixture are scarcely dissolved in the refrigerating machine oil, because, in the refrigerant circulating system of the invention, the refrigerating machine oil is non-soluble or slightly soluble with the refrigerant mixture. Hence, the mixing ratio of the refrigerant mixture in the refrigerant circulating cycle which is not dissolved in the refrigerating machine oil yet, scarcely changes from the mixing ratio which it had before put in the refrigerant circulating cycle and was detected nonflammable, and will not change into the mixing ratio with which it is inflammable. Furthermore, the refrigerating machine oil is nonflammable, and therefore, even if the refrigerant mixture is discharged into the air by accident, and an igniting source is present near it, it will never be ignited, and accordingly no fire is started.

Figure 10:
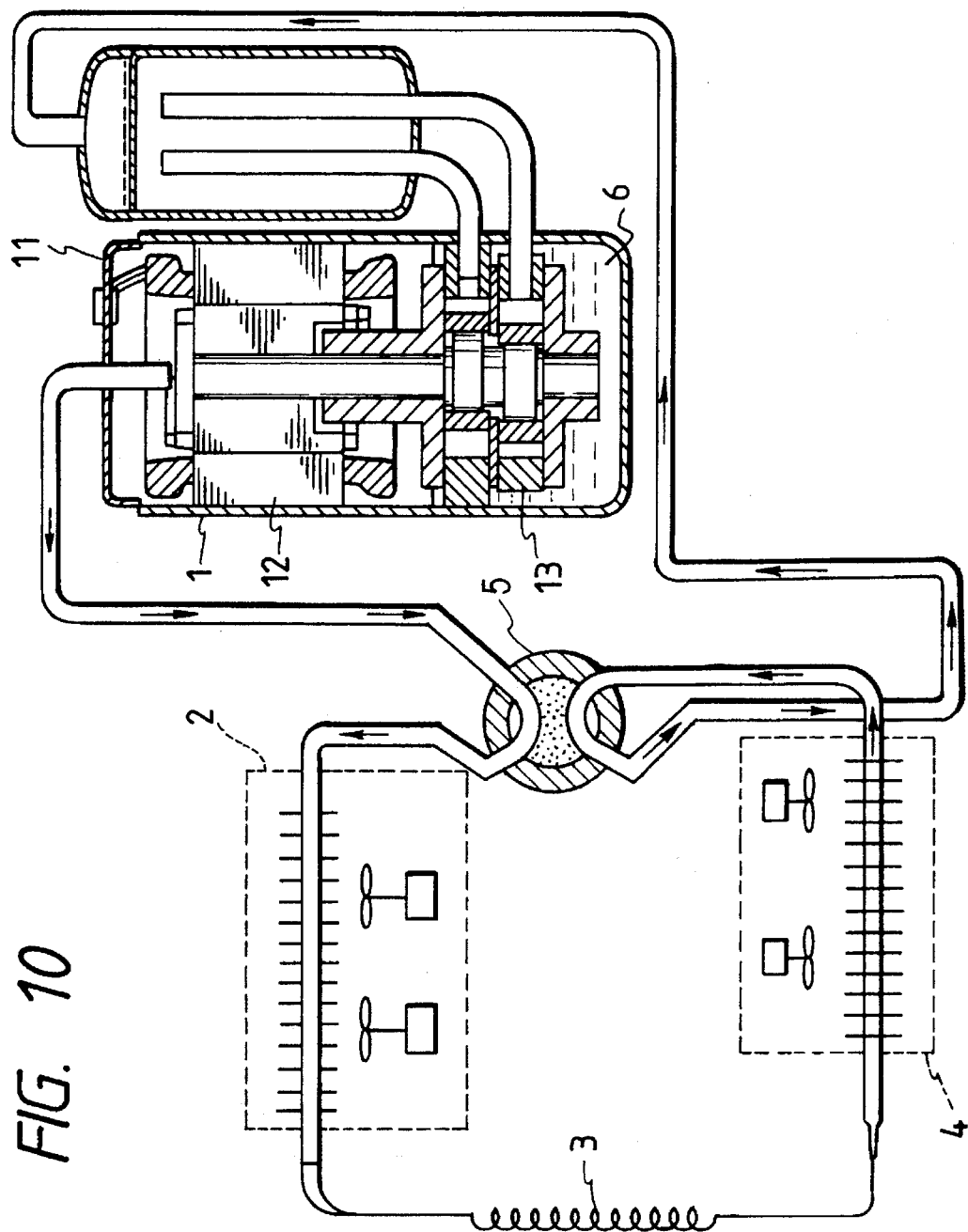
FIG. 10 is an explanatory diagram showing the arrangement of a refrigerant circulating system which constitutes a ninth embodiment of the invention.
Figure 11:
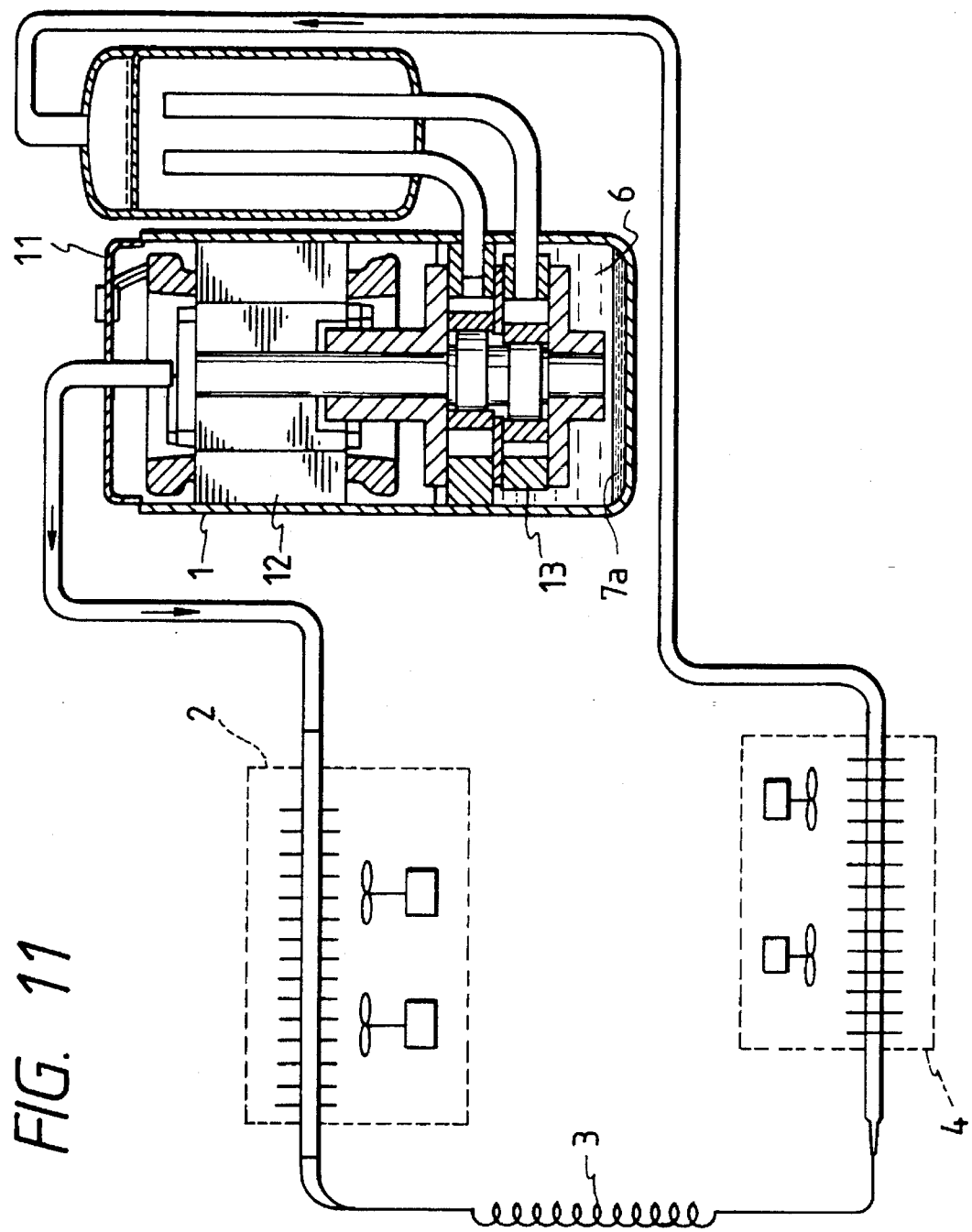
FIG. 11 is an explanatory diagram showing the arrangement of a refrigerant circulating system which constitutes a tenth embodiment of the invention.

FIG. 10 shows one example of a refrigerant circulating system which is applied, for instance, to an air conditioner. The refrigerant mixture sucked into a compressor 1, after being compressed by a compressing mechanism 13 in a closed container 11, cools electric motor 12. Thereafter, the refrigerant mixture is discharged through a 4-way valve 5 into a condenser 2. In this operation, the refrigerating machine oil 6 pooled in the bottom of the closed container 11 is exposed to the atmosphere of the refrigerant mixture sucked into the compressor; however, the refrigerant mixture is not substantially dissolved into the refrigerating machine oil 6, because the latter 6 is zero or extremely low in solubility.

Embodiment 10

A tenth embodiment of this invention will be described with reference to FIG. 130 Suppose here the use of a refrigerating oil that has low solubility with a refrigerant and which, in the range of ambient temperatures for the use of the refrigerant circulating system, assumes a smaller value of specific gravity than that of a liquid refrigerant as measured at the same temperature under the corresponding saturated vapor pressure; and also suppose the use of a single refrigerant or a mixture of two or more refrigerants that form an azeotropic system. If the temperature in evaporator 4 or condenser 2 is higher than that in compressor 1 even by the slightest margin, the refrigerant will be transferred into compressor 1 and a large amount of it will stay as liquid refrigerant 7a on the bottom of the compressor during shutdown of compressor 1. If, on the other hand, a non-azeotropic mixed refrigerant system is used as described hereinabove, the constituent having the lower boiling point will evaporate first and the constituent of the refrigerant to which the refrigerating oil in the compressor 1 is exposed has a lower boiling point than the liquid refrigerant staying in the evaporator 4 or the condenser 2 and, as a consequence, even if the temperature in the evaporator 4 or the condenser 2 is somewhat higher than the temperature in the compressor 1, there will be no transfer of the refrigerant towards the compressor 1. Therefore, even if the circulation system is restarted after prolonged shutdown, only a restricted amount of liquid refrigerant 7a will stay on the bottom of the compressor and the duration of time for which the liquid refrigerant 7a is supplied to the sliding part of the compressor 1 so as to reduce the efficiency of its lubrication can be shortened.

The "azeotropic mixed refrigerant" as mentioned hereinabove is such that the condition for the vapor composition of the refrigerant to become identical with its liquid composition exists at at least one point within the ranges of pressures and temperatures used. On the other hand, the "non-azeotropic mixed refrigerant" is such that the condition for the vapor of the refrigerant to become identical with its liquid composition does not exist at any point within the ranges of pressures and temperatures used.

For the solubility between a refrigerating oil and a refrigerant, see JIS K2211, Appendix 3, under "Method of Testing Solubility with Refrigerants", which states as follows: Place a sample oil and a refrigerant into a test tube and hold them at room temperature or heat them in a hot water bath until the sample oil and the refrigerant mix uniformly to form a clear solution. Then, cool the test tube and determine the temperature at which the solution yields two separate layers or at which the solution as a whole becomes turbid. The determined temperature shall be designated the "temperature for separation into two layers" at the oil fraction of interest (the percentage of the sample oil in its mixture with the refrigerant in solution) and used as an index for evaluating the solubility of the refrigerating oil with the refrigerant. This test is carried out within an oil fraction range of 5 to 60 wt %. Thus, a highly soluble oil is one having a low value of the "temperature for separation into two layers". The refrigerant circulating system that uses hydrofluorocarbon based refrigerants has heretofore employed refrigerating oils which, as typified by ester oils, have had solubility with refrigerants at all mixing ratios at least under the condensing pressure and temperature conditions. An oil of low solubility is one having a high value of the "temperature for separation into two layers" and, as typified by hard alkylbenzene oils which are employed in a refrigerant circulating system of the type described hereinabove which uses hydrofluorocarbon based refrigerants, this oil has no solubility at least in a certain mixing ratio over a full range from the condensing pressure and temperature conditions to the evaporating pressure and temperature conditions. Namely, the solubility is represented in the case of that the maximum temperature (UCST) for separation into two layers of the refrigerant and the refrigerating oils is greater than the condensing temperature and the weight ratio of the refrigerating oils is less than 0.5% to 7% (depending on the condensing temperature).

Figure 12:
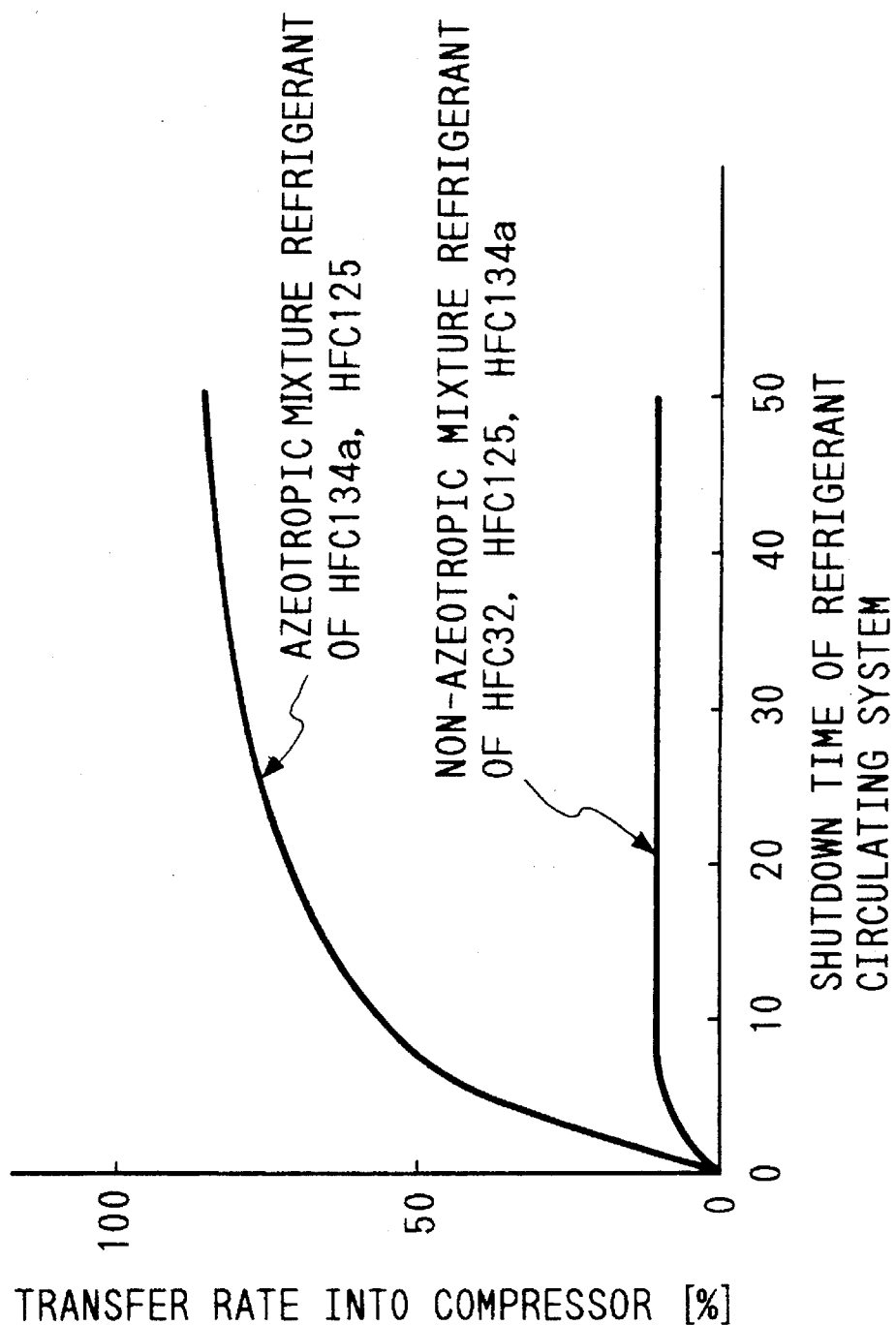
FIG. 12 is a graphical representation showing the percent transfer characteristics of two mixed refrigerant systems into the compressor.

The embodiment of the invention is described with reference to FIG. 12, which shows how the percent transfer into the compressor of refrigerants filled in refrigerant circulating systems (one using a non-azeotropic mixture of refrigerants HFC32, HFC125 and HFC134a and the other using an azeotropic mixture of HFC134a and HFC125) varies with the system shutdown time. Taken individually, HFC32 boils at −54.8° C., HFC125 at −48.6° C. and HFC134a at −26.2° C. Since HFC32 and HFC125 boil at much lower temperatures than HFC134a, the gaseous refrigerant formula in the refrigerant circuit is more abundant with HFC32 and HFC125 than the liquid refrigerant formula. As a result, the gaseous refrigerant in contact with the refrigerating oil in the compressor has a relatively low boiling point and is hard to liquefy, whereby the transfer of the refrigerant into the compressor is suppressed. Therefore, if a non-azeotropic mixed refrigerant is used, the amount of its transfer into the compressor is small even if the refrigerating oil used has low solubility and is smaller in specific gravity than the liquid refrigerant; hence, only a small amount of the liquid refrigerant will stay on the bottom of the compressor and one can shorten the duration of time for which the liquid refrigerant is supplied to the sliding part of the compressor so as to reduce the efficiency of its lubrication when the refrigerant circulating system is restarred after prolonged shutdown.

The percent transfer is expressed by the following:

Percent transfer=(the amount of refrigerant transfer to the compressor)/(the amount of refrigerant filling in the refrigerant circulating system)×100 (%)

The transfer is allowed to keep on by the force:

$\Delta p$=(the pressure in the liquid refrigerant reservoir in the refrigerant circuit)−(the pressure in the compressor)

The presence of $\Delta p$ is a prerequisite. In the equation, pressure is determined by the characteristics of the refrigerant and the temperature. With a single or azeotropic refrigerants, refrigerant's transfer is promoted as the following $\Delta t$ increases:

$\Delta t$=(the temperature in the liquid refrigerant reservoir in the refrigerant circuit)−(the temperature in the compressor)

Even if $\Delta t$=0, refrigerant's transfer will occur if a highly soluble refrigerating oil is used.

Hence, there will be no transfer of the refrigerant if it has no solubility at all with the refrigerating oil and if $\Delta t$=0.

With a single or azeotropic refrigerants, their transfer will start if $\Delta t$>0 and, eventually, all liquid refrigerant will be transferred to the low-temperature side.

With a non-azeotropic mixed refrigerant, the gas composition differs from the liquid composition even if $\Delta t$>0 and, hence, the amount of refrigerant that is eventually transferred will vary with the magnitude of $\Delta t$. The amount of eventual transfer is determined by the difference between gas and liquid compositions and the foregoing description of the difference in boiling point was intended to explain this fact. It should also be noted that the difference between gas and liquid compositions is affected by the species of mixed refrigerants, mixing ratio, liquid-gas ratio (i.e., temperature and pressure), temperature profile and the solubility of refrigerating oil.

Figure 13:
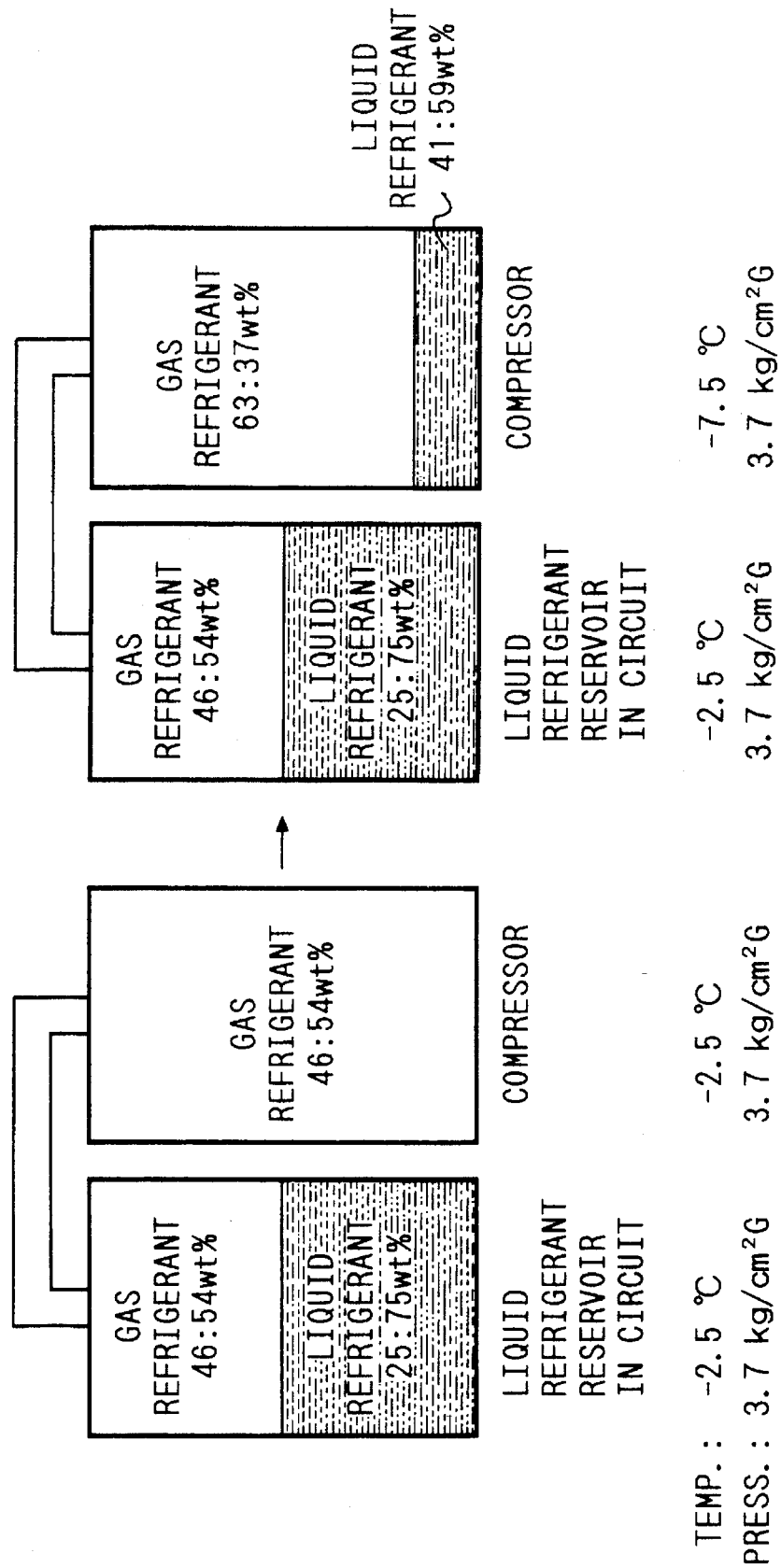
FIG. 13 is an illustration showing how a mixed refrigerant is transferred from the high-temperature to the low-temperature side.
Figure 14:
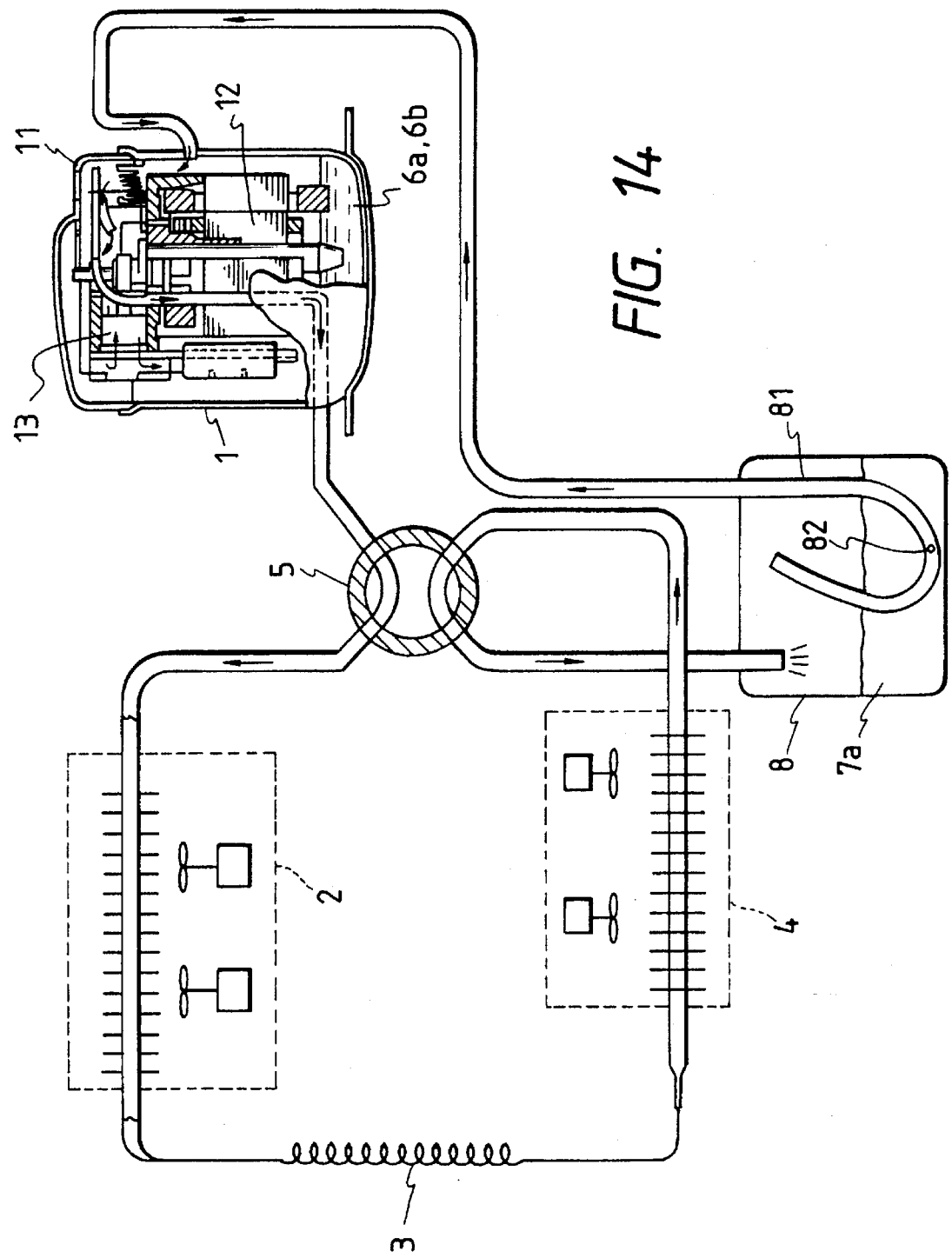
FIG. 14 is an explanatory diagram showing the arrangement of an example of a conventional refrigerant circulating system.
Figure 15:
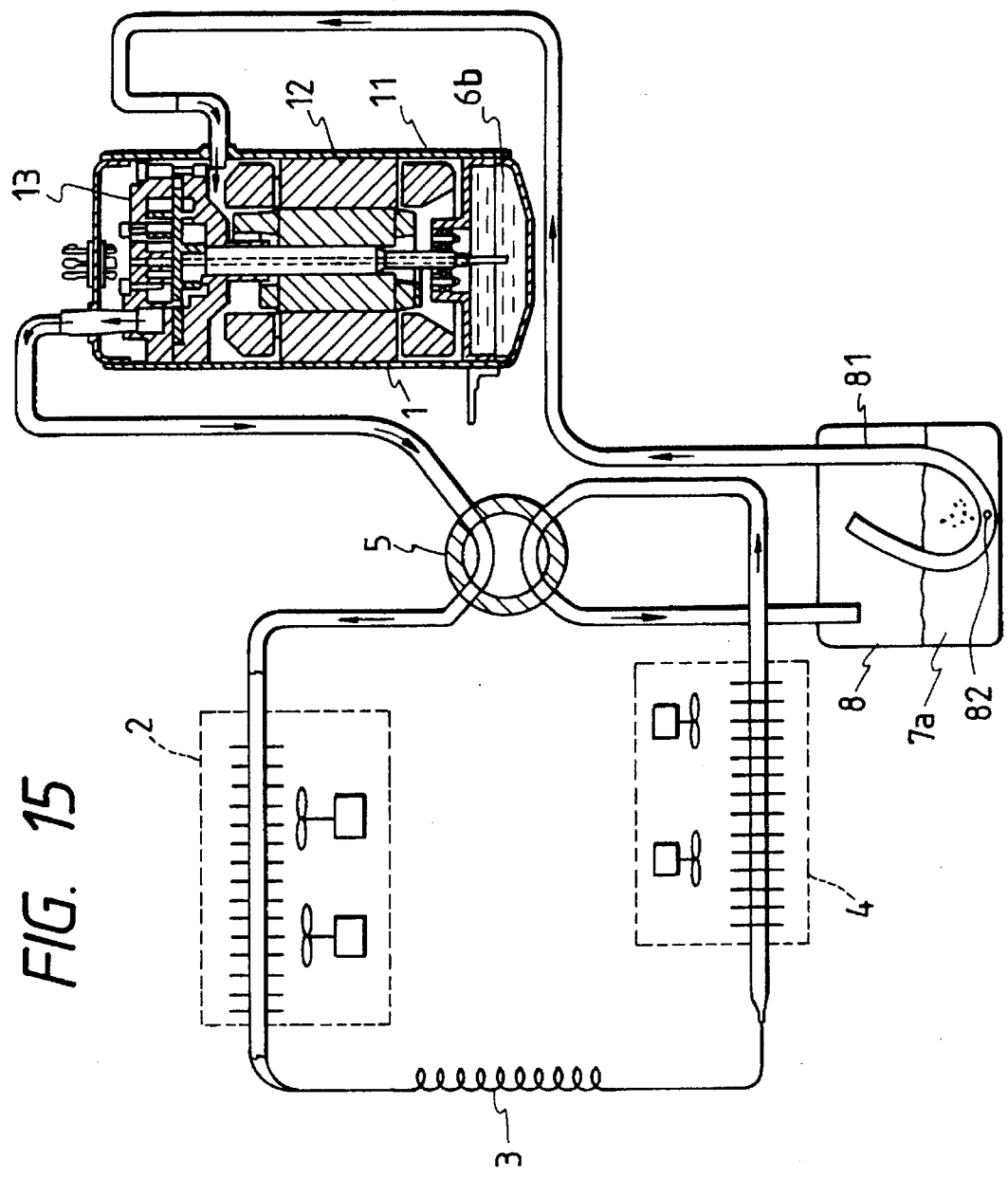
FIG. 15 is an explanatory diagram showing the arrangement of another example of the conventional refrigerant circulating system.
Figure 16:
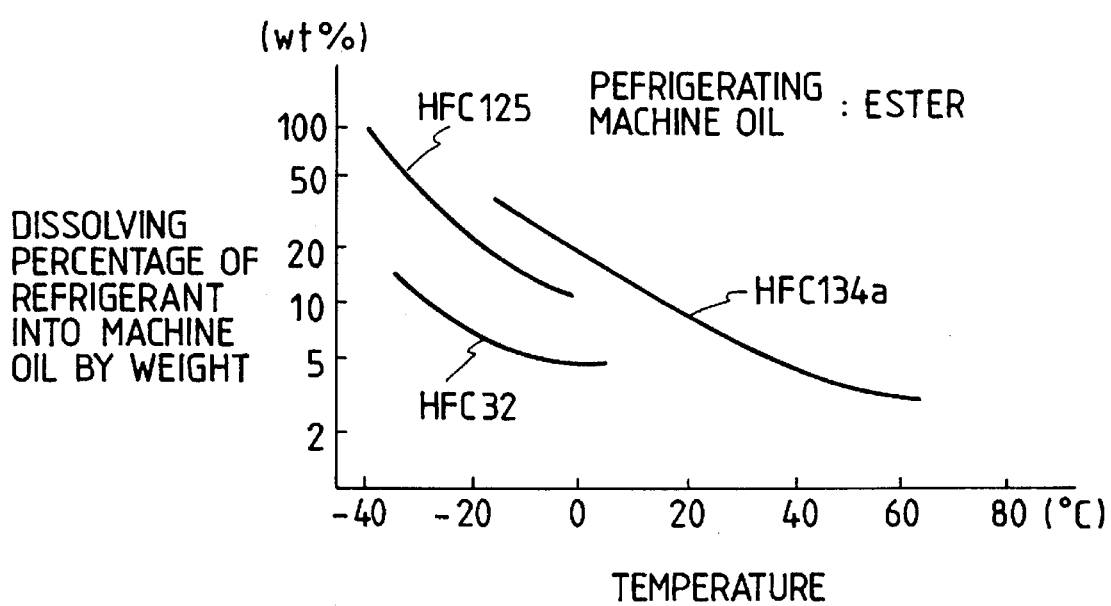
FIG. 16 is a graphical representation showing the percent solubility by weight of a refrigerant in a lubricating oil in the example shown in FIG. 15.

To take an example, a non-azeotropic HFC32/HFC134a mixed refrigerant is described below with reference to FIG. 13. Assume here that the two connected vessels are held in an atmosphere of −2.5° C. If one of the vessels contains a liquid refrigerant with an HFC32/HFC134a ratio of 25:75 in wt % (assuming the liquid refrigerant reservoir in the refrigerant circuit), the gas composition in the other vessel to which the first vessel is connected (assuming the compressor) will be 46:54 in wt % for HFC32/HFC134a; since the pressures in the two vessels are equal to each other at 3.7 kg/cm$^2$G, no refrigerant's transfer will occur. Then suppose that the temperature in the gas-containing vessel (i.e., equivalent to the compressor) is reduced from −2.5° C. down to −7.5° C. If the refrigerant were a single or azeotropic mixed refrigerant, it would be transferred continuously since the pressure on the low-pressure side is always low and, eventually, all liquid refrigerant would be transferred. In fact, however, the mixed refrigerant is nonazeotropic, so even if not all of the liquid refrigerant is transferred, part of the gas refrigerant in the compressor will be liquefied and, as shown in FIG. 13, the pressure in the low-temperature vessel can become equal to that in the high-temperature vessel, with the HFC32/HFC134a ratio being 41:59 by wt % in the liquid composition and 63:37 by wt % in the gas composition; hence, there will be no further transfer of the refrigerant. One might say that refrigerant's transfer can also take place due to the diffusion of the vapor phase but the diffusion rate of the vapor phase is generally so slow that it is by no means significant for practical purposes.

As discussed above, refrigerant's transfer is improved irrespective of the kind of refrigerating oil as long as the refrigerant used is a non-azeotropic mixed refrigerant. It should, however, be noted that the solubility of the refrigerating oil is also a factor to refrigerant's transfer and it can be further suppressed by using oils having no solubility. As far as refrigerant's transfer is concerned, there is no difference in merit between heavy and light oils but oils having no solubility, especially light ones, will prove very effective in assuring system reliability.

The foregoing discussion may be summarized as follows.

(i) Oil having no solubility and single or azeotropic refrigerants: All liquid refrigerant will be transferred if $\Delta t$>0 (no transfer will occur if $\Delta t$=0).

(ii) Oil having no solubility and non-azeotropic refrigerants: Liquid refrigerant will be transferred if $\Delta t$>0 but not all of it will be transferred if $\Delta t$ is small. The transfer of refrigerant is further restricted compared to the case of using a soluble oil.

In the embodiment, the refrigerating machine oil essentially contains chlorofluorocarbon polymer, or perfluorocarbon polymer, or perfluoroalkyl polyether.

In the above-described embodiments, the refrigerant mixture containing refrigerants HFC32, HFC125 and HFC134a is employed. This non-azeotropic three-refrigerant mixture is most suitable in efficiency, performance, pressure and safety as a replacement of a refrigerant HCFC 22 which is employed mainly for air conditioners and the use of which is to be decreased or inhibited because of its environmental pollution.

The refrigerant mixture containing HFC32 is much higher in efficiency and in performance than that which contains no HFC32. The refrigerant HFC32 is inflammable when isolated; however, it becomes practically nonflammable when mixed with the refrigerants HFC125 or HFC134a which is nonflammable with a certain mixing ratio. Therefore, the refrigerant mixture is safe. In order to further improve the safety of the refrigerant mixture, the percentage of HFC32 in it should be decreased; however, in this case, the efficiency is decreased as much. Hence, in the case where the margin of safety is maintained unchanged, it is preferable to use a non-soluble oil. That is, in the case where the non-soluble oil is employed, the percentage of HFC32 can be made larger than in the case where no non-soluble oil is employed. Therefore, a refrigerant mixture high in efficiency can be prepared.

The system of the invention is of the technique that handles a replacement of the inflammable refrigerant HCFC22 employed for air conditioner. For instance, the refrigerant mixture (azeotropic) containing the inflammable refrigerant HFC143a may be used as a replacement of a refrigerant R502 which is employed for a refrigerating system for instance in refrigerators.

The non-flammability of a refrigerating machine oil can be determined according to whether or not it has a flash point specified by the flash point measuring method, JIS K2265.

The reference for comparison of oil's specific gravity in the foregoing explanation is, in the case of a mixed refrigerant, the specific gravity of the liquid refrigerant for the composition of the mixed refrigerants in the refrigerant circuit.

It should also be mentioned that an azeotropic refrigerant also exists even for a mixture containing an inflammable refrigerant. Consider, for example, a mixture of two refrigerants, HFC143a which is inflammable and HFC125; the two refrigerants boil at close temperature and are held to be azeotropic (HFC143a boils at −47.7° C. and HFC125 boils at −48.1° C.).

The "non-azeotropic mixed refrigerant" is such that the conditions for the vapor of the refrigerant to become identical with its liquid composition does not exist at any point within the ranges of pressures and temperatures used.

It should also be noted that CST (critical solubility temperature) is none other than the temperature for separation into two layers as specified in JIS K2211 (p. 106). The description of the test method as specified in JIS K2211 refers to the "oil fraction range of 5 to 60 wt %" and this is because CST usually has a maximum value within that range. The maximum value is designated UCST (uppermost critical solubility temperature).

The refrigerant circulating system of the invention uses a non-azeotropic mixed refrigerant and, therefore, even if one uses a refrigerating oil which, at least in the range of ambient temperatures for the use of the system, assumes a smaller value of specific gravity than that of a liquid refrigerant as measured at the same temperature under the corresponding saturated vapor pressure, he or she can shorten the duration of time for which the liquid refrigerant is supplied to the sliding part of the compressor so as to reduce the efficiency of its lubrication when the system is restarted after prolonged shutdown.

In addition, the saturated moisture content of the refrigerating oil is held at small value, so moisture control that is comparable to the prior art level is sufficient to assure more-than-comparable levels of quality.

The saturated moisture content is defined by the following procedure: a sample refrigerating oil is left to stand in air atmosphere at a temperature of 30° C. and at a relative humidity of 85% and the change in the moisture content of the oil is measured over time and the value which is approached infinitely by the measured values is designated the "saturated moisture content".

The above-described refrigerator oils may be used satisfactorily as they are, without additives. However, their characteristics such as wear resistance, load resistance and thermal stability may be improved by adding one or some of the additives such as an oxidation inhibitor, extreme pressure additive, wear preventing agent, thermal stability improving agent, and deforming agent.

The oxidation inhibitor is of a hinderd phenol group, amine group, or sulfur group. Examples of the oxidation inhibitor are 2,6-di-t-butyl-4-methylphenol; 4,4'-methylenebis (2,6-di-t-butylphenol); 2,2'-thio-bis(4-methyl-6-t-butylphenol); trimethyl hydroquinone; p,p'-diactyl-diphenylamine; 3,7-diactylphenthiazine; alkylphenothiazine-1-carboxylate; phenyl-2-naphthylamin; 2,6-di-t-butyl-2-dimethyl-p-cresol; 5-ethyl-10,10'-diphenylphenazaline, and alkyl disulfide, each of which is used as much as 0.2 to 5% by weight.

Examples of the extreme pressure additive and the wear preventing agent are ester phosphate, ester phosphite, alkyl- or aryl-phosphorothionate, halogeno-hydrocarbon, halogenated carbonic acid, dialkyl- or diaryl-dithiophosphate metallic acid, dialkyldithiocalbamic acid metallic salt, and oil-soluble molybdenum sulfide containing compound, each of which is used as much as 1 to 30% by weight.

An example of the thermal stability improving agent is an epoxy compound, which is used as much as 0.2 to 5% by weight.

Examples of the deforming agent are dimethyl polysiloxane, and carboxylic metal salt, each of which is used as much as 0.001 to 0.1% by weight.

The refrigerant circulating system of the invention designed as described above mainly uses a refrigerant which essentially contains hydrofluorocarbon, and a refrigerating machine oil which shows slight solubility with a liquid refrigerant when condensed and non-solubility or low solubility when evaporated. Therefore, the system is high in electrical insulation and in moisture resistance, and is high in reliability since the oil is smoothly returned into the compressor.

In the refrigerant circulating system, the refrigerant lead-out pipe extended from the accumulator has a plurality of oil returning holes. Therefore, a large quantity of refrigerating machine oil is not pooled in the accumulator; that is, the refrigerating machine oil is positively returned to the compressor, and an excess of refrigerant can be stored depending on the load.

In the system, the refrigerating machine oil of the compressor is held in the refrigerant space on the high pressure side, which reduces the mixing percentage of the refrigerating machine oil which mixes with the discharged gas to flow in the system. Thus, the system of the invention is high in reliability and excellent in heat exchange effectiveness.

Furthermore, in the system, the back flow preventing mechanism for preventing the back flow of gas from the compressor to the evaporator is provided between the evaporator and the compressor, which eliminates the difficulty that, when the compressor is not in operation, the gas leaking from the high pressure side flows through the suction pipe to the evaporator to increase the temperatures of the latter and its relevant components, and therefore the power consumption is reduced as much. In this connection, the oil can be positively returned through a plurality of oil returning holes formed in the refrigerant lead-out pipe extended from the accumulator.

Furthermore, in the system of the invention, the mixing percentage of the refrigerating machine oil with the gas discharged from the compressor is reduced, so that the refrigerating machine oil flowing in the system is positively returned to the compressor. Thus, the system is high in reliability. When this is combined with the oil returning technique that an oil is returned through a plurality of oil returned holes formed in the refrigerant lead-out pipe extended from the accumulator, the oil can be more positively returned to the compressor.

In the system, the oil separator is provided on the discharge side of the compressor to reduce the mixing percentage of the refrigerating machine oil with the discharged gas.

Therefore, the system is high both in reliability and in heat exchange effectiveness. When this technique is combined with the above-described oil returning technique, then the oil can be more effectively returned into the compressor.

The system has the control valve between the evaporator and the compressor, and the control means for closing the control valve when the compressor is not in operation. Therefore, when the compressor is not in operation, the control valve can be closed to prevent the flow from the evaporator to the compressor, which eliminates the difficulty that the compressor is insufficiently lubricated so that for instance the shaft is seized.

In the system, the refrigerant essentially contains hydrofluorocarbon, and the refrigerating machine oil is non-soluble or slightly soluble with the liquid refrigerant on the evaporation side and is substantially equal in specific weight to the liquid refrigerant. Hence, the system is high both in electrical insulation and in moisture resistance.

Furthermore, the system according to another aspect of the invention uses the refrigerant which essentially contains hydrofluorocarbon, and the refrigerating machine oil which is non-soluble or slightly soluble with the liquid refrigerant on the evaporation side and is larger in specific weight than the liquid refrigerant. Hence, the system is high both in electrical insulation and in moisture resistance. The compressor sealing and lubricating functions are greatly stabilized, and the electrical insulation and the moisture resistance are both improved. Furthermore, the refrigerating machine oil is less allowed to flow in the system, and even when it flows in the system, it is positively returned into the compressor. Thus, the system of the invention is high in reliability.

The molecule of a hydrofluorocarbon is composed of hydrogen (H), carbon (C) and fluorine (F) atoms, so in order to manufacture refrigerating oils having greater values of specific gravity, it is at least necessary to provide atoms having atomic weights at least larger than fluorine. However, substances composed of large atomic weights are generally expensive. On the other hand, light refrigerating oils of the type used in the present invention can be manufactured at low cost since substances composed of H, C and O atoms will suffice.

If a refrigerant is used together with a refrigerating oil of low solubility, the dissolution of the refrigerant into the refrigerating oil will not increase even if the temperature of the oil or the refrigerant in contact with it approaches the saturation point of the latter at the pressure of the atmosphere in which the refrigerating oil is placed. Consequently, the viscosity of the liquid being supplied to the sliding part is maintained at a sufficiently high level to reduce the chance of the occurrence of seizure and other troubles in the sliding part.

Speaking also of the case of using a refrigerating oil of low solubility, the part of the oil which leaks out of the oil seal portion towards the suction side of the compression space contains only a small amount of refrigerant and, hence, the loss due to a second expansion and compression in the compression cycle is sufficiently reduced to prevent the drop in efficiency.

If a non-azeotropic mixed refrigerant system is used, it is acceptable to use a refrigerating oil which, at least in the range of ambient temperatures for the use of the refrigerant circulating system, assumes a smaller value of specific gravity than that of a liquid refrigerant as measured at the same temperature under the corresponding saturated vapor pressure. During shutdown of the compressor, only a restricted amount of the refrigerant will be transferred from the evaporator or the condenser into the compressor on the bottom of which it will stay as a liquid refrigerant. As a result, one can shorten the duration of time for which the liquid refrigerant is supplied to the sliding part of the compressor so as to reduce the efficiency of its lubrication when the system is restarted after prolonged shutdown.

The refrigerant circulating system of the invention insures that the refrigerating oil which is used for compressor lubrication, sealing and other purposes will flow out in small quantities to the condenser, throttle mechanism and evaporator; at the same time, the compressor will discharge only a limited amount of oil and, hence, the refrigerating oil that has flowed out can positively be returned to the compressor, thereby preventing the drop in the heat-exchange efficiency of the condenser and the evaporator.

The refrigerant circulating system of the invention insures that the refrigerating oil which is used for compressor lubrication, sealing and other purposes will flow out in small quantities to the condenser, throttle mechanism and evaporator; at the same time, the refrigerating oil that has flowed out can positively be returned to the compressor, thereby preventing the drop in the heat-exchange efficiency of the condenser and the evaporator.

The refrigerant circulating system of the invention insures that the refrigerating oil which is used for compressor lubrication, sealing and other purposes and which has flowed out to the condenser, throttle mechanism and evaporator can positively be returned to the compressor, thereby preventing the drop in the heat-exchange efficiency of the condenser and the evaporator.

The refrigerant circulating system of the invention has yet another advantage in that even if the refrigerant is released into the air atmosphere on account of a certain trouble or the like and even if there is an ignitable heat source nearby, the refrigerant will not catch fire and, as a result, one can avoid hazards such as the occurrence of disastrous fire.

Further, the refrigerant circulating system of the invention uses a nonflammable refrigerating oil and, hence, it will not ignite even if it is released as a mist into the air atmosphere.

In the system of the invention, the refrigerant mixture is scarcely dissolved in the refrigerating machine oil. Therefore, when the refrigerant mixture is used which contains a plurality of refrigerants at least one of which is inflammable, the mixing ratio of the refrigerant mixture in the refrigerant circulating cycle scarcely changes from the mixing ratio which it had before being put in the refrigerant circulating cycle and was detected non-flammable. Hence, the system is free from the difficulty that the refrigerant mixture is partially dissolved in the refrigerating machine oil, so that its mixing ratio changes into a value with which the refrigerant mixture is inflammable. Thus, the refrigerant mixture is maintained nonflammable. Therefore, even when the refrigerant mixture is discharged into the air by accident, and there is an igniting source near it, it will never be ignited, and therefore no fire is caused thereby. That is, the refrigerant circulating system of the invention is high in safety.

Furthermore, in the system of the invention, the refrigerant mixture is substantially not dissolved in the refrigerating machine oil. Therefore, when the refrigerant mixture is used which contains a plurality of refrigerants at least one of which is inflammable, the mixing ratio of the refrigerant mixture in the refrigerant circulating cycle scarcely changes from the mixing ratio which it had before being put in the refrigerant circulating cycle and was confirmed non-flammable. Hence, the system is free from the difficulty that the refrigerant mixture is partially dissolved in the refrigerating machine oil, so that its mixing ratio changes into a value with which the refrigerant mixture is inflammable. Thus, the refrigerant mixture is maintained nonflammable. Furthermore, the refrigerating machine oil is nonflammable, and therefore even when the refrigerant mixture is discharged into the air by accident, and there is an igniting source near it, it will never be ignited, and therefore no fire will be caused thereby. Thus, the refrigerant circulating system of the invention is high in safety.

Hydrofluorocarbons (HFC) are promising refrigerants that could replace CFC12 and HCFC22 which are on the list of materials that need to be used less or totally disused in view of the environmental problems they have caused. However, such hydrofluorocarbons do not contain chlorine atoms in the molecule, so unlike CFC12 and HCFC22 which have chlorine molecules, they are not expected to offer such an advantage that the sliding part of the compressor which is placed under boundary lubrication conditions forms a compound such as iron chloride on the metal surface, thereby improving in wear resistance.

Further, ester oils having high solubility with hydrofluorocarbons have low extreme pressure quality (high-pressure viscosity index) and, hence, increase the chance for the sliding part of the compressor to be subjected to the boundary lubrication conditions, as compared to paraffinic or naphthenic oils which have heretofore been employed in the refrigerant circulating system that uses CFC12 or HCFC22 as the refrigerant.

Therefore, refrigerant circulating systems that use hydrofluorocarbons as refrigerants, particularly in the case where soluble ester oils are employed as refrigerating oils, have encountered a problem with the wear resistance of the sliding part of the compressor. This problem, however, can be solved by using slightly soluble oils.

Being designed as described above, the refrigerant circulating system of the invention is excellent both in electrical resistance and in moisture resistance, and high in reliability.

Having the structural features described hereinabove, the invention offers the advantage of providing a refrigerant circulating system of high reliability and efficiency that is capable of suppressing the escape of an oil from the compressor in the system and which insures smooth oil return so that the oil will not collect or stay in any unsuitable areas.

The refrigerant circulating system of the invention, being constructed as described above, is high in safety being free from a fear that it may cause a fire.

Having the structural features described hereinabove, the invention offers the added advantage of providing a system of high reliability that is free from any abnormalities in the sliding part of the compressor even if the system is restarred after prolonged shutdown.

What is claimed is:

1. A refrigerant circulating system comprising:
   a compressor that uses a hydrofluorocarbon based single or mixed refrigerant and which draws in a gaseous refrigerant containing a liquid refrigerant while discharging it as a high-pressure gaseous refrigerant;
   a condenser positioned downstream of said compressor for condensing the high-pressure gaseous refrigerant discharged from said compressor;
   a throttle mechanism positioned downstream of said condenser for reducing a pressure of a liquid refrigerant leaving said condenser; and
   an evaporator positioned downstream of said throttle mechanism for vaporizing the liquid refrigerant or a gas-liquid phase refrigerant leaving said throttle mechanism, and in which system a refrigerating oil is contained within one of said compressor provided in said system or in a separate tank at least part of said refrigerating oil being exposed to said refrigerant for performing the function of at least one of lubrication or sealing, wherein said refrigerating oil has such a solubility that a weight factor of dissolution thereof in the liquid refrigerant is 0.5 to 7% under condensing pressure and temperature conditions, and the refrigerant is a mixture of refrigerants at least one of which is an inflammable refrigerant.

2. A refrigerant circulating system comprising:
   a compressor that uses a fluoroamine, fluoroether, fluoropropane, fluoroethane, fluorosilane or fluorosulfur based single or mixed refrigerant and which draws in a gaseous refrigerant containing a liquid refrigerant while discharging it as a high-pressure gaseous refrigerant;
   a condenser positioned downstream of said compressor for condensing the high-pressure gaseous refrigerant discharged from said compressor;
   a throttle mechanism positioned downstream of said condenser for reducing a pressure of a liquid refrigerant leaving said condenser; and
   an evaporator positioned downstream of said throttle mechanism for vaporizing the liquid refrigerant or a gas-liquid phase refrigerant leaving said throttle mechanism, and in which system a refrigerating oil is contained within one of said compressor provided in said system or in a separate tank, at least part of said refrigerating oil being exposed to said refrigerant for performing the function of at least one of lubrication or sealing, wherein said refrigerating oil has such a solubility that a weight factor of dissolution thereof in the liquid refrigerant is 0.5 to 7% under the condensing pressure and temperature conditions, and the refrigerant is a mixture of refrigerants at least one of which is an inflammable refrigerant.

3. A refrigerant circulating system according to claim 1 or 2, wherein the refrigerating oil has a smaller value of specific gravity than said liquid refrigerant.

4. A refrigerant circulating system according to claim 3, wherein the refrigerating oil is based on at least one member of the group consisting of alkylbenzenes, poly-alpha-olefins, paraffinic oils, naphthenic oils, polyphenylethers, polyphenylthioethers, and chlorinated paraffins.

5. A refrigerant circulating system according to claim 3, wherein the refrigerant is a mixture of nonazeotropic refrigerants.

6. A refrigerant circulating system according to claim 3, wherein the refrigerating oil is such that, at least in the range of ambient temperatures for the use of said system, it assumes a smaller value of specific gravity than that of the liquid refrigerant as measured at the same temperature under the corresponding saturated vapor pressure and wherein the refrigerant is a non-azeotropic mixed refrigerant.

7. A refrigerant circulating system according to claim 3 further comprising an accumulator provided with a lead-out pipe for leading the refrigerant out of said accumulator, said lead-out pipe having a plurality of holes which are different in height as measured from a bottom of said accumulator.

8. A refrigerant circulating system according to claim 4, wherein a backflow preventing mechanism is provided between said evaporator and said compressor, or between a four-way valve provided in a first connecting portion between said evaporator and said compressor and a second connecting portion provided between the compressor and the condenser, or between said accumulator and said pipe connected to a suction side of said compressor.

9. A refrigerant circulating system according to claim 1 or 2, wherein the refrigerating oil has a greater value of specific gravity than the liquid refrigerant.

10. A refrigerant circulating system according to claim 9, wherein the specific gravity of the refrigerating oil is such that, in the temperature range of −20° C. to +60° C., the refrigerating oil assumes a greater value than the specific gravity of the liquid refrigerant as measured at the same temperature under the corresponding saturated vapor pressure.

11. A refrigerant circulating system according to claim 9, wherein the refrigerating oil is based on a chlorofluorocarbon polymer, perfluorocarbon polymer, perfluoroalkylpolyether, modified silicone or a chlorinated aromatic compound.

12. A refrigerant circulating system according to claim 9, wherein the refrigerant is a mixture of refrigerants at least one of which is inflammable.

13. A refrigerant circulating system according to claim 1 or 2, wherein a bottom of the compressor to contain the refrigerating oil or said separate tank is located on a high-pressure side of said compressor or said system.

14. A refrigerant circulating system according to claim 1 or 2, wherein means for separating the refrigerating oil having a greater specific gravity than the gaseous refrigerant is incorporated in said compressor so that a weight factor of the presence of the refrigerating oil being discharged from said compressor as part of the high-pressure gaseous refrigerant is not higher than the weight factor of dissolution of the refrigerating oil in the liquid refrigerant under the condensing pressure and temperature conditions.

15. A refrigerant circulating system according to claim 1 or 2, wherein an oil separator is connected to a discharge side of said compressor.

16. A refrigerant circulating system according to claim 1 or 2, wherein the refrigerating oil has no solubility or only slight solubility such that the weight factor of dissolution of said refrigerating oil in the liquid refrigerant under an evaporating pressure and temperature condition is 0 to 2%.

17. A refrigerant circulating system comprising:
   a compressor that draws in a gaseous refrigerant containing a liquid refrigerant while discharging it as a high-pressure gaseous refrigerant;
   a condenser positioned downstream of said compressor for condensing the high pressure gaseous refrigerant discharged from said compressor;
   a throttle mechanism positioned downstream from said condenser for reducing a pressure of a liquid refrigerant leaving said condenser; and
   an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to the refrigerant atmosphere, wherein the refrigerant is a mixture of HFC32, HFC125 and HFC134a, said refrigerating oil has such a solubility that a weight factor of dissolution thereof in the liquid refrigerant is 0.5 to 7% under condensing pressure and temperature conditions, and said refrigerating oil has a smaller value of specific gravity than said liquid refrigerant.

18. A refrigerant circulating system according to claim 12, wherein the refrigerating oil is nonflammable.

19. A refrigerant circulating system comprising:
   a compressor that draws in a gaseous refrigerant containing a liquid refrigerant while discharging it as a high-pressure gaseous refrigerant;
   a condenser positioned downstream of said compressor for condensing the high-pressure gaseous refrigerant discharged from said compressor;
   a throttle mechanism positioned downstream of said condenser for reducing the pressure of a liquid refrigerant leaving said condenser; and
   an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to a refrigerant atmosphere, wherein said refrigerant is a hydrofluorocarbon based mixture of nonazeotropic refrigerants, and said refrigerating oil is lighter than said liquid refrigerant and dissolves only slightly in the latter.

20. A refrigerant circulating system comprising:
   a compressor that draws in a gaseous refrigerant containing a liquid refrigerant while discharging it as a high-pressure gaseous refrigerant;
   a condenser positioned downstream of said compressor for condensing the high-pressure gaseous refrigerant discharged from said compressor;
   a throttle mechanism positioned downstream of said condenser for reducing a pressure of a liquid refrigerant leaving said condenser; and
   an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to refrigerant atmosphere, wherein said refrigerant is a non-azeotropic mixed refrigerant based on at least one member of the group consisting of fluoroamine, fluoroether, fluoropropane, fluoroethane, fluorosilane or fluorosulfur and said refrigerating oil is lighter than said liquid refrigerant and dissolves only slightly in the latter.

21. A refrigerant circulating system according to claim 19 or 20, wherein at least one constituent of the mixed refrigerant is an inflammable refrigerant.

22. A refrigerant circulating system comprising:
   a compressor that draws in a gaseous refrigerant containing a liquid refrigerant while discharging it as a high-pressure gaseous refrigerant;
   a condenser positioned downstream of said compressor for condensing the high-pressure gaseous refrigerant discharged from said compressor;
   a throttle mechanism positioned downstream of said condenser for reducing a pressure of a liquid refrigerant leaving said condenser;
   an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to refrigerant atmosphere, wherein said refrigerant is a mixture of refrigerants at least one of which is inflammable and said refrigerating oil is lighter than said liquid refrigerant and dissolves only slightly in the latter.

23. A refrigerant circulating system according to claim 22, wherein the refrigerating oil is nonflammable.

24. A refrigerant circulating system according to claim 19, 20 or 22, wherein a temperature for separation into two layers, one being the refrigerant and the other being the refrigerating oil, is equal to or higher than a condensing temperature.

25. A refrigerant circulating system comprising:

a compressor that draws in a gaseous refrigerant containing a liquid refrigerant while discharging it as a high-pressure gaseous refrigerant;

a condenser positioned downstream of said compressor for condensing the high-pressure gaseous refrigerant discharged from said compressor;

a throttle mechanism positioned downstream of said condenser for reducing a pressure of a liquid refrigerant leaving said condenser; and an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to a refrigerant atmosphere, wherein said refrigerant is based on hydrofluorocarbon, said refrigerating oil has a smaller value of specific gravity than said liquid refrigerant and a maximum of a temperature for separation into two layers, one being said refrigerating oil and the other being said liquid refrigerant, is equal to or higher than a condensing temperature;

wherein a saturated water content of said refrigerating oil is less than 300 ppM.

26. A refrigerant circulating system comprising:

a compressor that draws in a gaseous refrigerant containing a liquid refrigerant while discharging it as a high-pressure gaseous refrigerant;

a condenser positioned downstream of said compressor for condensing the high-pressure gaseous refrigerant discharged from said compressor;

a throttle mechanism positioned downstream of said condenser for reducing the pressure of a liquid refrigerant leaving said condenser; and an evaporator positioned downstream of said throttle mechanism for vaporizing the liquid refrigerant or a gas-liquid phase refrigerant leaving said throttle mechanism, and in which system a refrigerating oil for performing the function of at least one of lubrication or sealing is contained within one of said compressor provided in said system or in a separate tank, part or all of said refrigerating oil being exposed to a refrigerant atmosphere, wherein said refrigerant is based on at least one member of the group consisting of fluoroamine, fluoroether, fluoropropane, fluoroethane, fluorosilane or fluorosulfur, said refrigerating oil has a smaller value of specific gravity than said liquid refrigerant, and a maximum of a temperature for separation into two layers, one being said refrigerating oil and the other being said liquid refrigerant, is equal to or higher than a condensing temperature;

wherein a saturated water content of said refrigerating oil is less than 300 ppM.

27. A refrigerant circulating system according to claim 1, 2, 17, 19, 20, or 22 wherein a saturated water content of said refrigerating oil is less than 300 ppM.

28. A refrigerant circulating system according to claim 2, wherein a backflow preventing mechanism is provided between said evaporator and said compressor, or between a four-way valve provided in a first connecting portion between said evaporator and said compressor and a second connecting portion provided between the compressor and the condenser, or between said accumulator and said pipe connected to a suction side of said compressor.

* * * * *